United States Patent [19]

Herman et al.

[11] 4,227,194

[45] Oct. 7, 1980

[54] SYNTHETIC ARRAY PROCESSOR

[75] Inventors: Elvin E. Herman, Pacific Palisades; Frederick C. Williams, Topanga, both of Calif.

[73] Assignee: Hughes Aircraft Company, Culver City, Calif.

[21] Appl. No.: 106,293

[22] Filed: Jan. 4, 1971

[51] Int. Cl.³ ............................................. G01S 13/90
[52] U.S. Cl. ............................. 343/5 CM; 343/5 DP
[58] Field of Search ......................... 343/5 CM, 5 DP

[56] References Cited

U.S. PATENT DOCUMENTS

| | | | |
|---|---|---|---|
| 3,228,028 | 1/1966 | Baum et al. | 343/5 CM |
| 3,271,765 | 9/1966 | Pulford | 343/5 CM |
| 3,365,719 | 1/1968 | Williams | 343/5 CM |

Primary Examiner—T. H. Tubbesing
Attorney, Agent, or Firm—Lawrence V. Link, Jr.; W. H. MacAllister

[57] ABSTRACT

The method and apparatus for processing bipolar coherent sidelooking radar data to achieve continuous real time synthetic array mapping in the form of focused line-by-line imagery. Received radar data is correlated such that a number of subarrays are vectorially combined with appropriate quadratic phase corrections to continuously form the total synthetic array. Each subarray is accumulated in a recirculating (feedback) channel which applies a linear phase correction and amplitude weighting, which in turn reduces the arithmetic operations required to form the array. The subarrays are updated by continuously subtracting out the oldest data and adding new data to yield continuous line-by-line imagery. Alternate accumulator and feedback channels are employed in an interleaved fashion to minimize the buildup of "round-off" errors which result from digital multiplications. The invention is adaptable to all-range-focusing and operation at various pointing angles.

33 Claims, 17 Drawing Figures

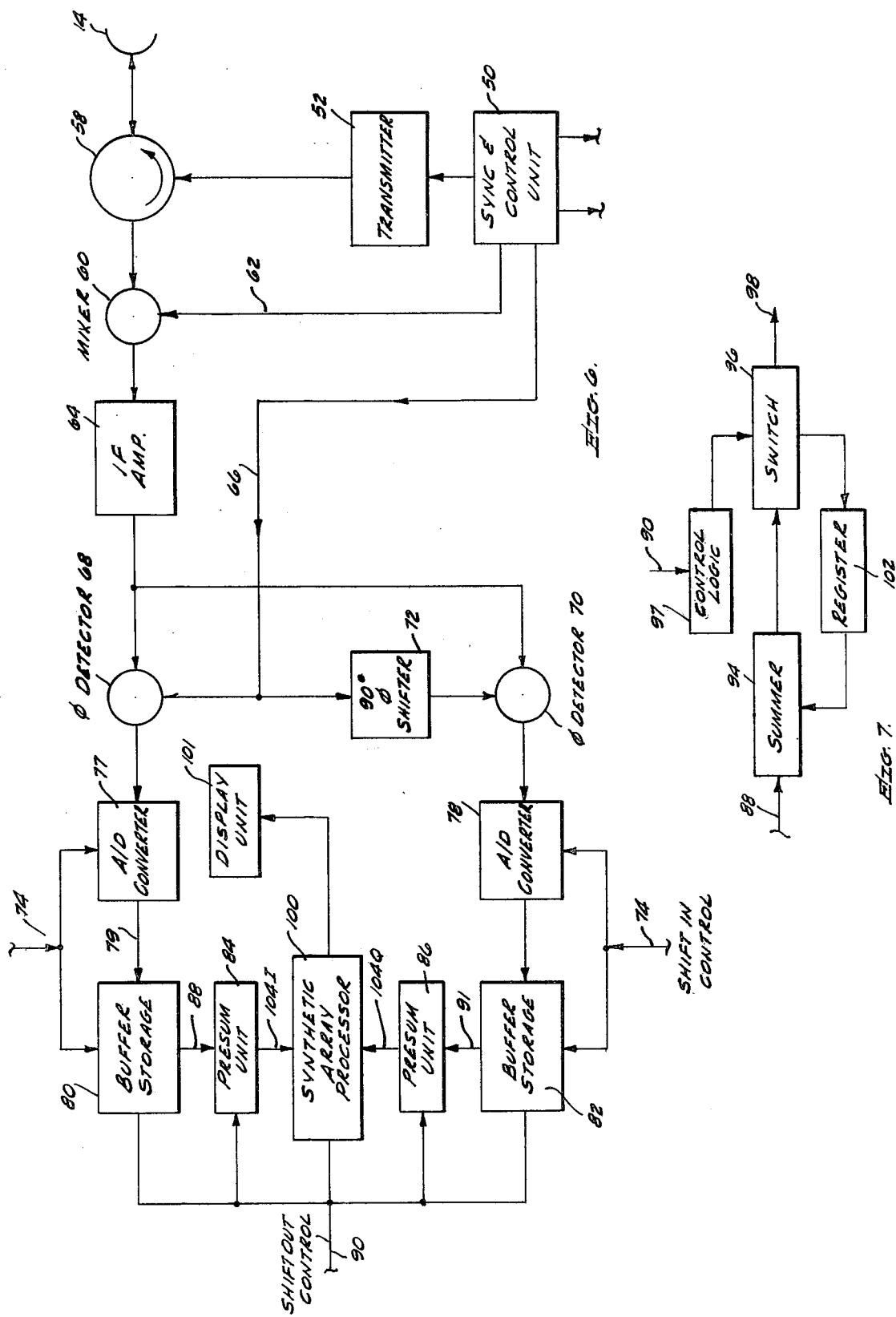

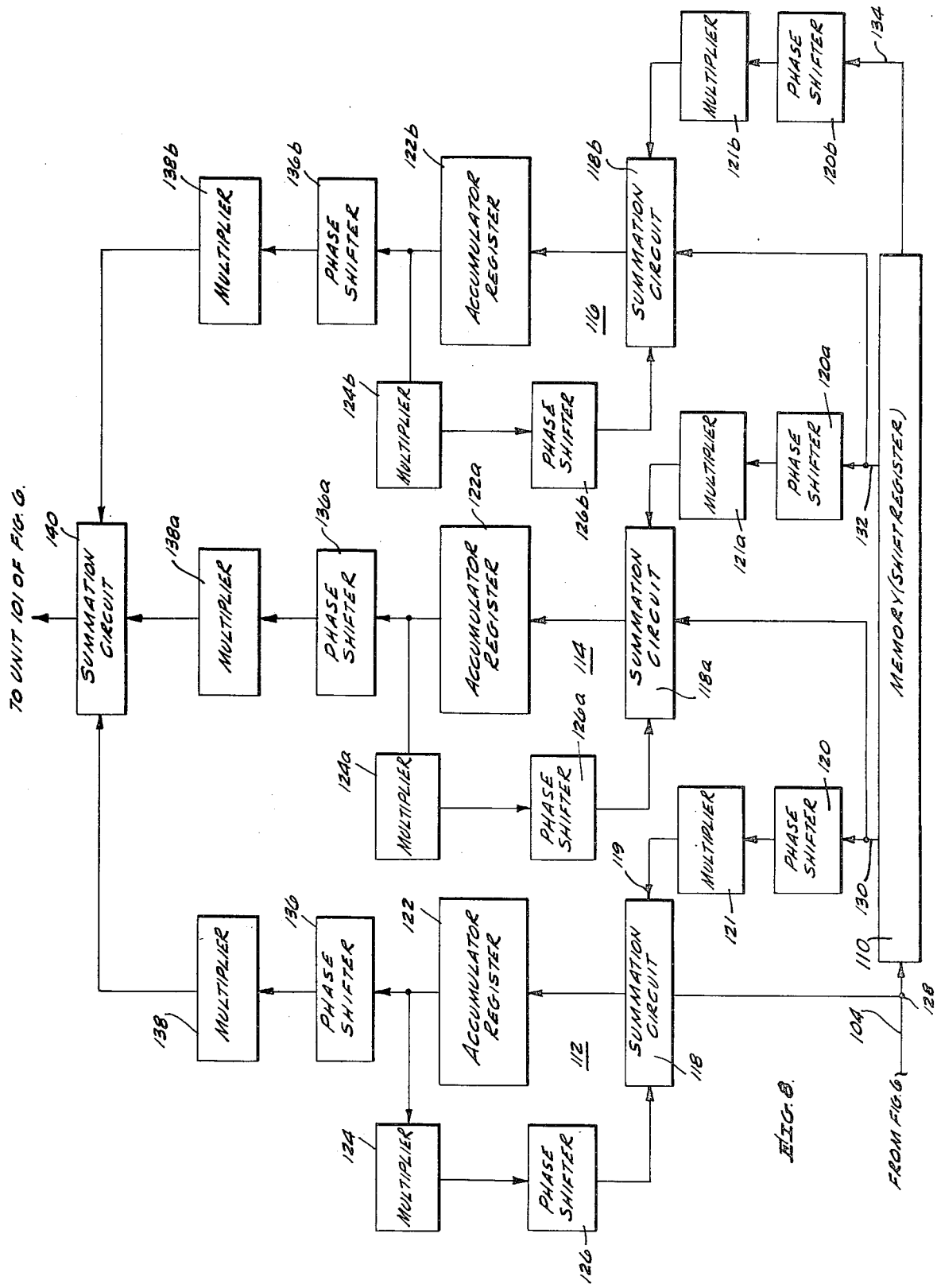

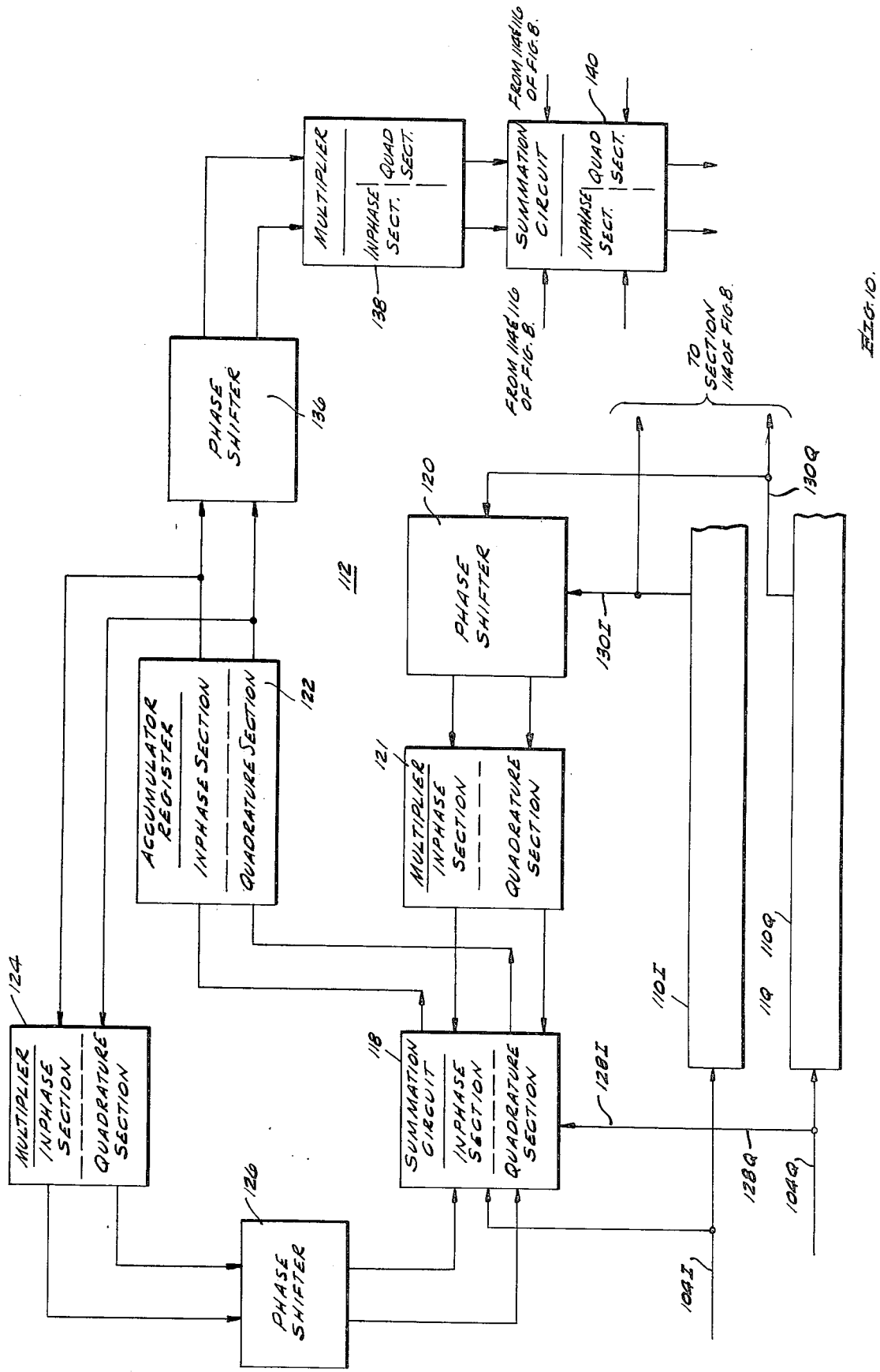

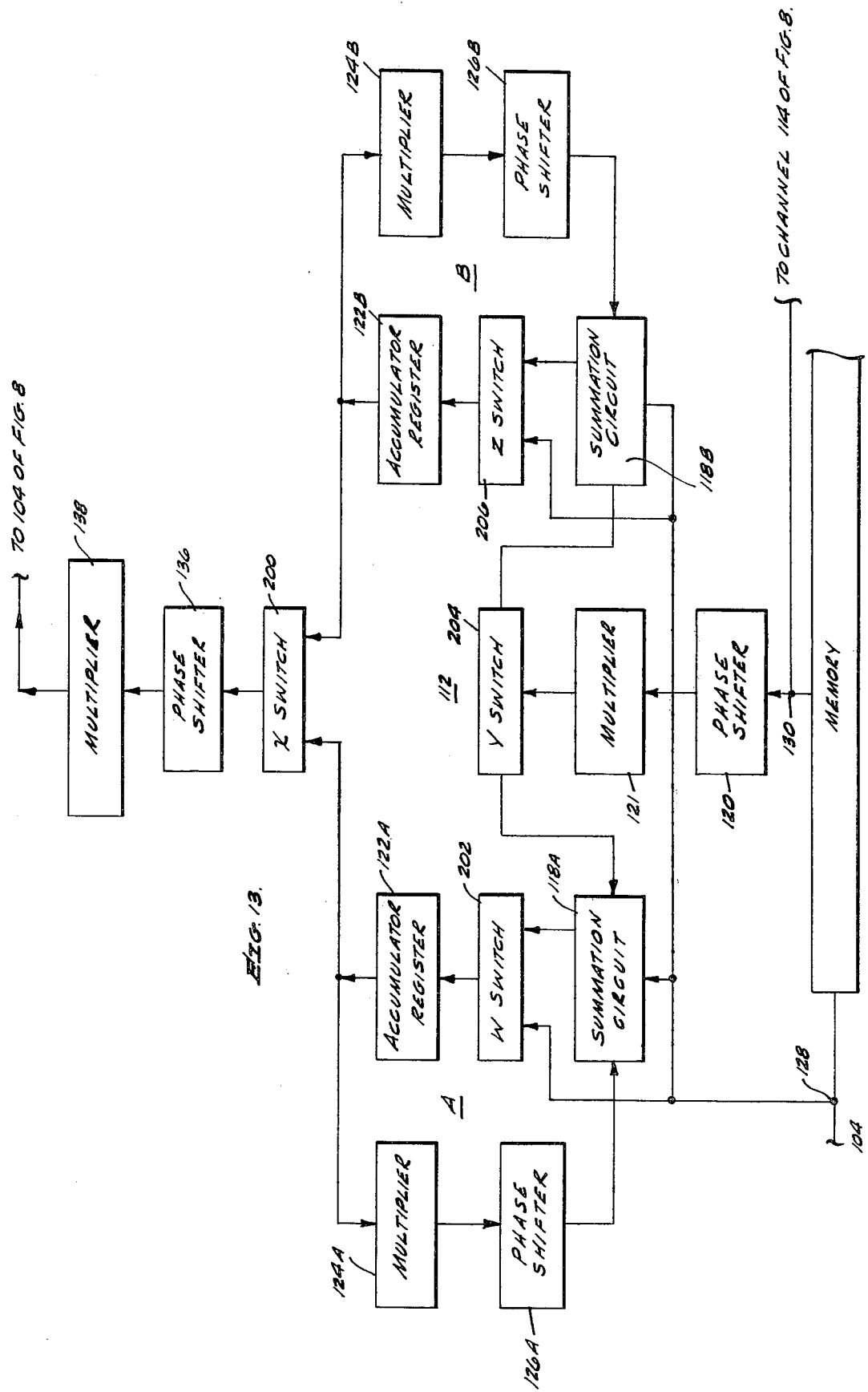

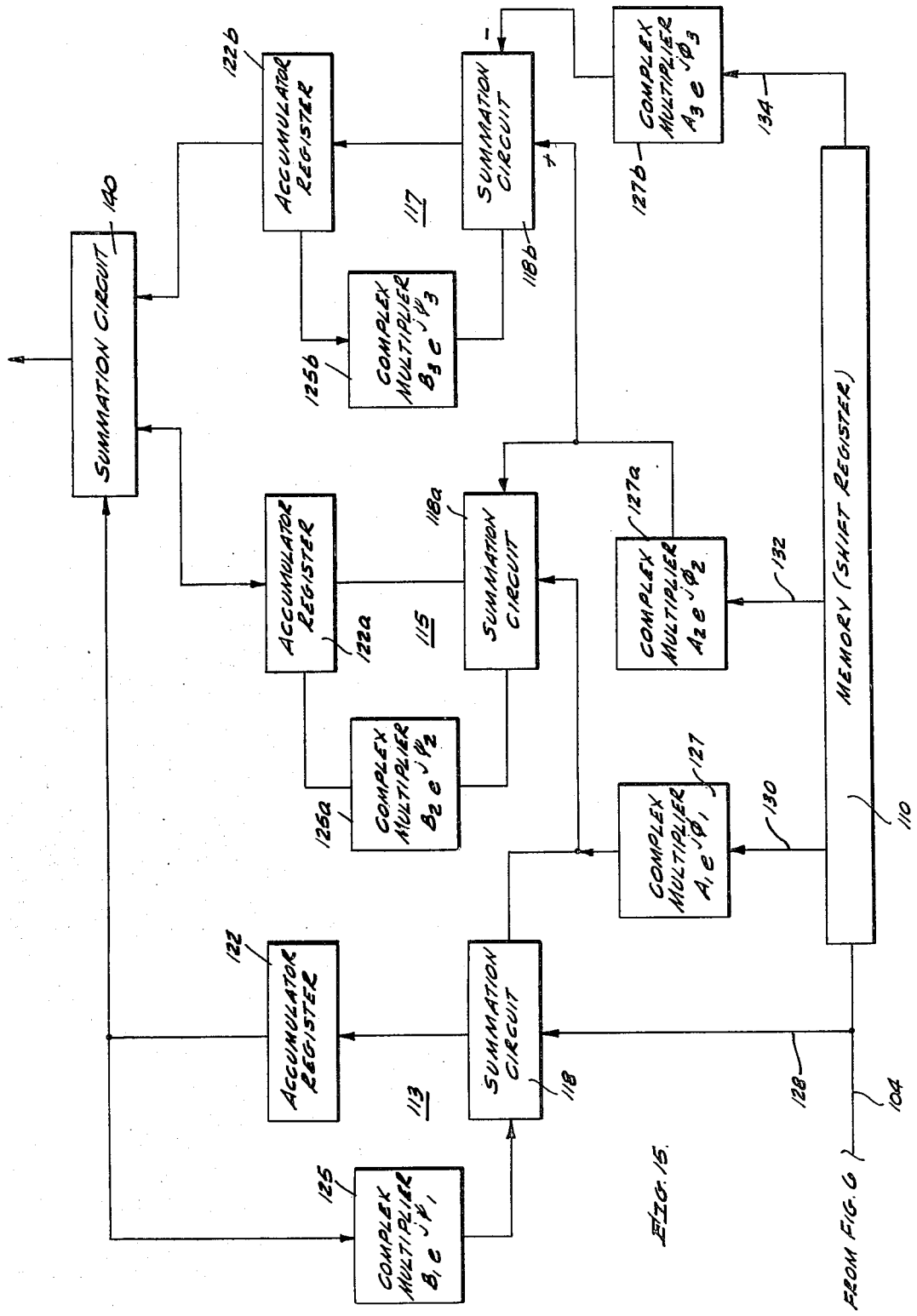

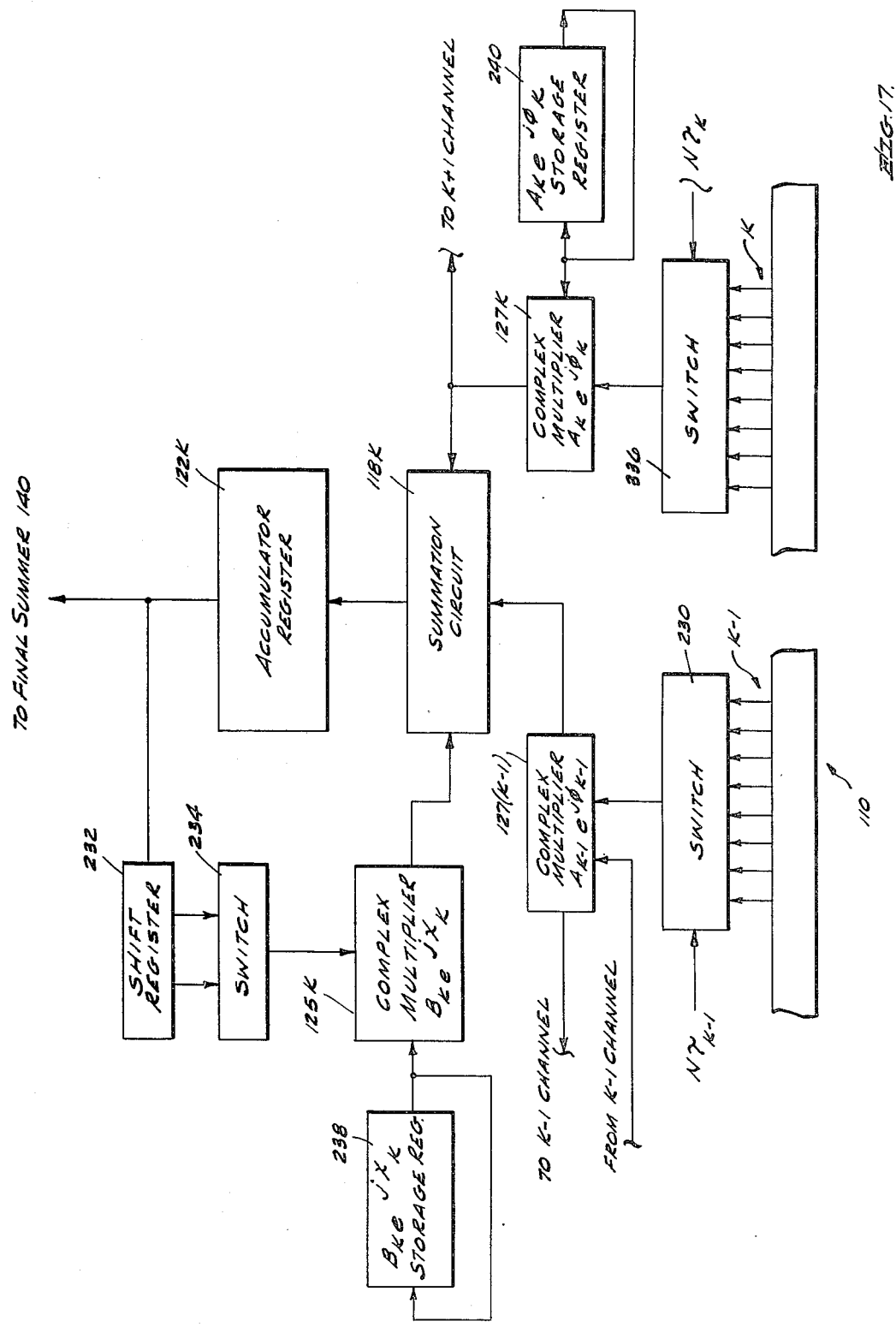

SYNTHETIC ARRAY PROCESSOR

BACKGROUND OF THE INVENTION

This invention relates generally to synthetic array mapping processors and more particularly to the method and apparatus for providing focused line-by-line imagery from coherent sidelooking radar data.

In synthetic array mapping, azimuth resolution is enhanced by periodically sampling the radar data from each range resolution element within the illuminating beam, as the radar antenna is moved along a flight path; and by correlating and integrating (electronic focusing) the received sampled data. This electronic focusing simulates the physical focus (narrow azimuth beam width) of an antenna which approaches the length of the flight path over which the synthetic array was formed, i.e. the path length along with the samples forming the array were taken.

In airborne focused synthetic array radar when mapping broadside along a straight-line flight path, phase corrections have to be applied to the bipolar coherent radar data to achieve signal vector focus. For the received radar data involved in forming a particular synthetic array, the phase corrections are those required to compensate for the two-way quadratically varying range to a particular ground point scatterer. This range variation may be visualized by recalling that the locus of constant range to a given ground scatter is defined by a circle, while the flight path approximates a straight line.

In one type of prior art line-by-line focused synthetic array processor, overlapping successive synthetic arrays are formed by correlating the coherent raw data over an entire array interval at least every time the aircraft has flown a distance corresponding to an azimuth (along-track) resolution element. Each time this correlation takes place, most of the "raw" data from the previous array is resued; the oldest data is dropped out of the correlation process and a new segment of raw data is added. Considering a given range sweep or a particular raw data sample of bipolar echo data, it occupies progressively more rearward positions in each synthetic array as the mapping process continues. For this reason, the amount of phase correction required for a particular raw data sample is not constant, but varies in a quadratic fashion as the particular data element assumes various positions further aft in subsequent arrays. Thus in continuous line-by-line processing dynamically changing phase corrections have been typically applied in the readout of the raw data, not as the data is entered into storage.

Another electronic processing technique which has been employed for implementing a continuous real-time synthetic array "strip map" involves presumming several unfocused groups of returns or subarrays with no phase corrections applied within the subarrays. These unfocused subarrays are then combined to form a total focused synthetic array by phase correcting each unfocused subarray presum as their outputs are added vectorially to form the total array. Due to the "out and back" nature of radar, the magnitude of the "group" phase corrections which must be applied to the particular subarray presums as they are combined to form the total synthetic array, is twice the horizontal (one-way) displacement of the subarrays from the flight path to the circle of constant range. "Group" phase corrections are equivalent to laterally displacing the data perpendicular to the flight path. In the above just described system the phase corrections are applied only to the outputs of the running presums as these presums are added together to form a total array. Thus each presum by itself, before phase correction, consists of undisplaced data gathered along the straight-line flight path. A presum can therefore be continuously updated by dropping off its oldest data as new data is added, then by phase correcting each presum and continuously adding them together, continuous line-by-line imagery is obtained. In regard to this just described technique, when no focusing is done within a subarray, in order for the phase error of all subarrays to be kept reasonable, the subarray lengths must be made shorter in those subarrays which lie outward toward the array extremities. This is because the curvature of the semicircular line corresponding to constant phase (range to a particular ground scatter) is greater at the array extremities. This makes for inefficient processing by requiring a large number of subarrays when quite high resolution (a long total array) is involved.

Another approach to focused line-by-line electronic correlation has involved a sweep integrator such as a recirculating delay line preceded by a programmable phase shifter to accomplish the signal vector rotations. When operating so as to map broadside, this phase shifter has applied to it a quadratic phase (signal vector rotation) program so as to compensate for the two-way range variation between the straight-line flight path and the cord of constant range to a given ground resolution element. When a total array length is completed, the integrator's output sum represents a line of correlated imagery and a particular phase shifter-integrator channel can only then have its data "dumped" and the phase shifter reprogrammed to start the next contiguous array. Thus with only one such channel, only one line of imagery would result per array length. For the just described arrangement to yield successive and contiguous lines of imagery, parallel channels must be provided; each with a quadratic phase program sequence "staggered" with respect to its neighboring channel. With such a multiple channel arrangement, at any instant the channels are in different stages of array completion. Because there must be at least one channel for every azimuth resolution element within an array, very high resolutions dictate a large number of channels; and with many parallel channels the total arithmetic operations involved to accomplish the requisite vector rotations become quite large, particularly at long mapping ranges where the array lengths become quite long.

Another approach to focused synthetic real-time processing has been the so-called "batch" correlation process. In "batch" processing systems bipolar coherent radar returns are analog-to-digital converted, and then applied to a digital memory or store until it is filled. The storage process is then stopped, whereupon the stored data is read out and operated on (correlated) in multiple channels to produce a poly-angle (multiple-beam) two-dimensional imagery "patch". Correlated output imagery produced by "batch" processing is a built-up mosaic of carefully registered small keystone shaped "patches", where each patch is the result of poly-angle correlating a particular "batch" of data. Taken together these registered sub-images comprise a complete image or map. "Batch" processing methods are satisfactory in many applications, but because of the non-rectangular shape of the patches or subframes in certain applications having high resolution and wide swath width (range dimension) requirements, image alignment problems introduce complexities in recording and/or displaying the complete map.

SUMMARY OF THE INVENTION

It is therefore a primary object of the subject invention to provide an improved method and apparatus for electronically processing radar data to yield real-time, continuous, high resolution synthetic array imagery with a reduction in the number of required arithmetic operations.

Another object is to provide a synthetic array mapping system which is practical to implement for high resolution long range applications and which provides imagery in a format readily adapted for recording and/or display.

A further object of the subject invention is to provide a synthetic array mapping system which makes practical, from a complexity standpoint, ultrahigh resolution line-by-line radar imagery at relative large mapping range.

Yet another object is to provide an improved synthetic array radar processor which provides high resolution, long range, continuous line-by-line imagery; which is adaptable to digital implementation; which reduces the buildup of digital multiplication "round-off" errors; and which is adaptable to all-range focusing and operation with varying antenna look (mapping) angles.

The subject invention comprises an improved method and apparatus for processing sidelooking radar data to provide continuous, real-time, high resolution synthetic array imagery. Digitized processing channels form a series of small subarrays with linear (approximate) phase corrections applied within each subarray. Each subarray is continuously updated by subtracting off the oldest data and adding the newest. Simultaneously the linearly focused subarrays are continuously combined (summed into a total focused synthetic array by applying an appropriate quadratic "group" phase correction to each subarray running presum output either at the input to the linear phase correction or as it is fed to a total array summing unit. Hence, the synthetic arrays are formed over the approximate equivalent of overlapping, semicircular flight path segments (constant range and hence phase). Each of these equivalents to a semicircular flight path segment around a given point on the ground is built up not as a series of parallel straight-line segments of varying lengths as in some prior devices, but instead as a series of equal length non-parallel straight-line segments, each with an appropriate slope so that it can be displaced by application of the "group" phase correction to, in effect, lie tangent to the semicircle of constant range. Since all straight-line segments will lie tangent to respective segments of the semicircle, these subarray lengths can be equal and yet stay within the same phase tolerances no matter where they lie, respectively, in the total array. Because they all lie tangent to the circle of constant range, each subarray can be made equal to the length of the longest possible one of the above described prior art systems. Because linear, not quadratic, incremental phase corrections are applied within each subarray processing channel, the oldest data in each channel can be continually subtracted out; new data added, and data already in storage can have progressive incremental phase corrections applied as it successively recirculates and occupies further aft positions within the subarray. In the above described manner approximations to overlapping semicircular arrays are sequentially formed with each subarray and the total array comprised thereof, assuming successive positions further along the flight path, thereby yielding continuous line-by-line imagery.

Phase shifting elements in each subarray processing channel may be dynamically programmed to provide all-range-focusing. Additionally squint angles for other than broadside synthetic array mapping can be accommodated by proper selecting of the phase values of said phase shift elements and by programming the processor's range delays as a function of the range closure associated with each subarray.

BRIEF DESCRIPTION OF THE DRAWINGS

The novel features of this invention, as well as the invention itself, will be better understood from the following description taken in conjunction with the accompanying drawings in which like reference characters refer to like or similar parts and in which:

FIG. 6 is a block diagram of a radar mapping system incorporating a synthetic array processor in accordance with the subject invention;

FIG. 7 is a block diagram of a presum unit suitable for use in the system of FIG. 6;

FIG. 8 is a block diagram of one preferred embodiment of a synthetic array processor in accordance with the subject invention;

FIG. 10 is a block diagram of one channel of the processor of FIG. 8 for illustrating the inphase and quadrature processing features incorporated therein;

FIG. 13 is a portion of a second preferred embodiment of a synthetic array processor in accordance with the subject invention adapted for reducing digital multiplication "round-off" error accumulation;

FIG. 15 is a block diagram of a second preferred embodiment of a synthetic array processor in accordance with the subject invention;

FIG. 17 is a block diagram of one subarray processor channel of the embodiment of FIG. 15 with the addition of programmable complex multipliers and range interpolators to compensate for the defocusing effects of swath width and squint angle mapping.

DESCRIPTION OF THE PREFERRED EMBODIMENTS

Figure 1:
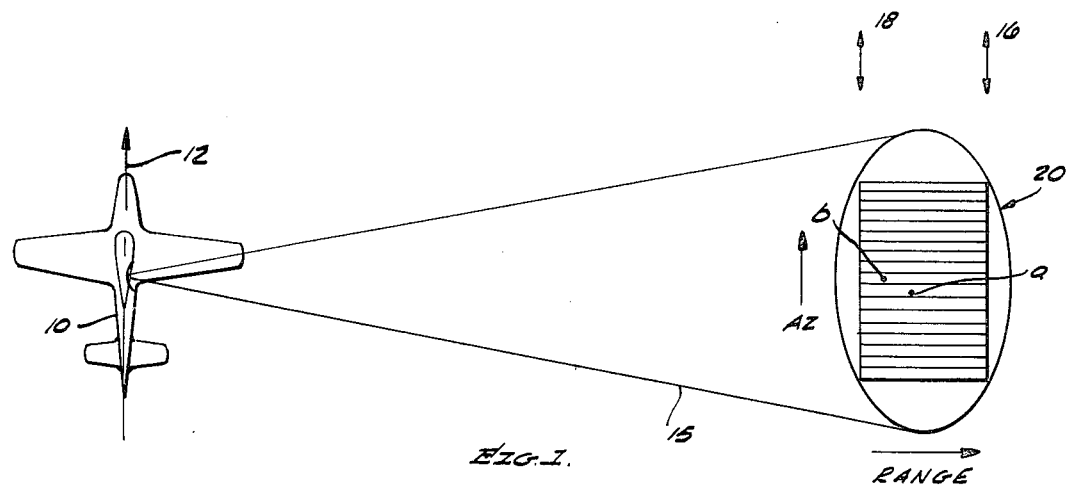
FIG. 1 illustrates, for "broadside" mapping, the flight path—terrain relationship of the radar data processed by the line-by-line synthetic array processors of the subject invention.
Figure 2:
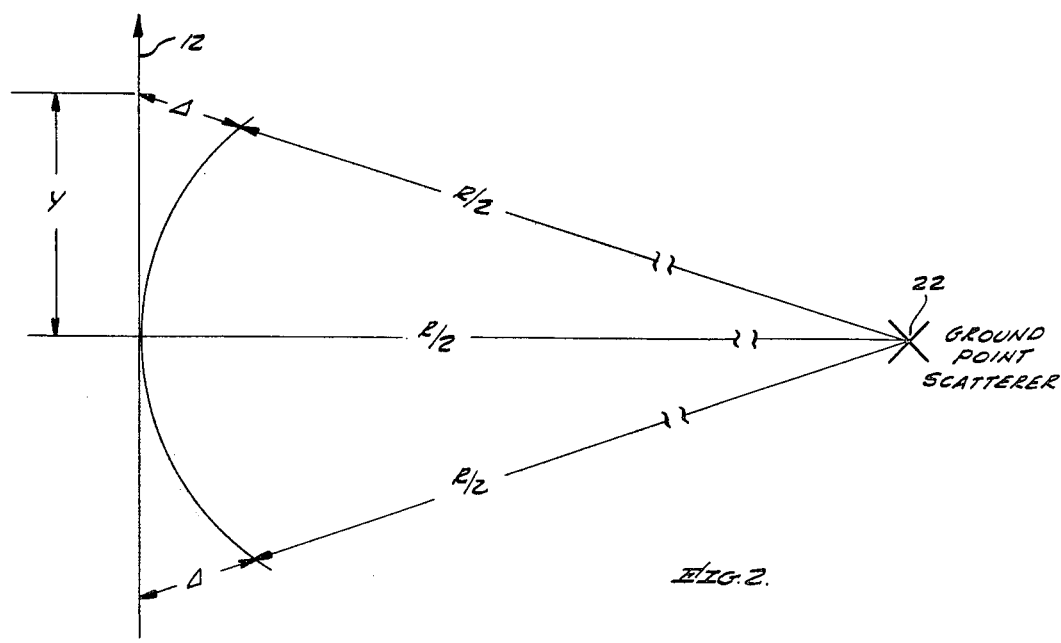
FIG. 2 shows for the purpose of explaining the phase correction required for synthetic array processing, the geometric relationship between the flight path and a given ground scatter.
Figure 3:
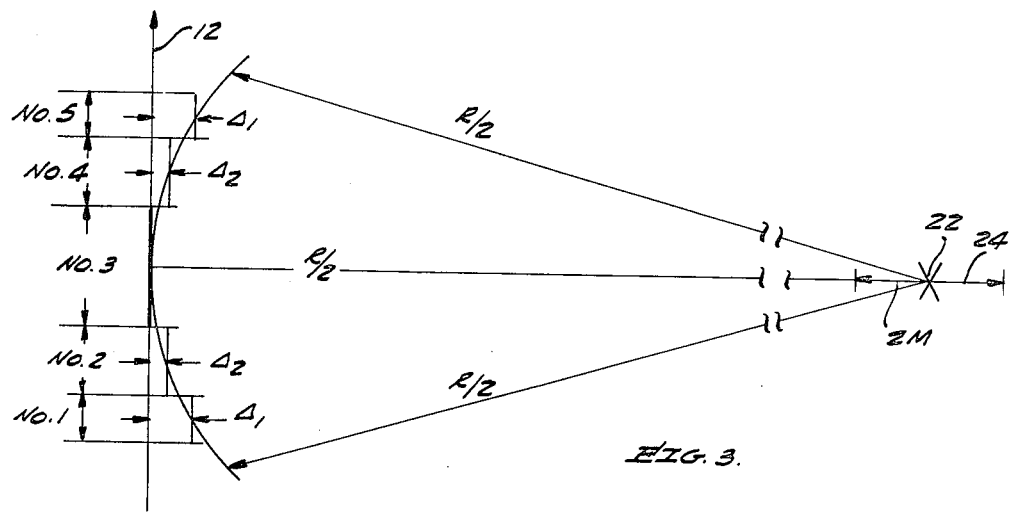
FIG. 3 depicts the phase correction associated with focused arrays formed from unfocused presums, for explaining the advantages of the subject invention.

The subject invention may be better understood by first considering the relationship between the flight path of the ground mapping aircraft and the electronic focused synthetic array. As shown in FIG. 1, an aircraft 10 is assumed to follow a straight-line flight path 12, and an antenna 14 illuminates a section of terrain which includes maximum and minimum ranges 16 and 18 respectively. The received signal reflected from discrete scatters within real antenna beam 15 is periodically sampled at successive range intervals as the illuminating beam is moved past each ground scatter. The synthetic array processor in accordance with the subject invention correlates and integrates, i.e. electronic focuses this received radar data to simulate the physical focus (narrow azimuth beam width) of an antenna which approaches the length of the flight path over which the synthetic arrays are formed. As will be explained herein, the method and apparatus in accordance with the subject invention provides for processing the received data to achieve continuous, real-time, synthetic array mapping in the form of focused line-by-line imagery in a pattern such as strip map 20 shown in FIG. 1. The aximuth resolution between discrete ground scatters such as scatters "a" and "b" of FIG. 1 is a function of the length of the synthetic array, whereas the range resolution between discrete scatters is a function of the transmitted—bandwidth. The phase corrections associated with the data forming a particular array are those required to compensate for the two-way quadratically varying range (R), as illustrated in FIG. 2—i.e. twice the distance between the straight-line flight path and a theoretical semicircular flight path centered on a given ground point scatter. The magnitude of the $\Delta$'s shown in FIG. 2 depicts the one-way range variation and have been exaggerated to better illustrate the variation over an array. For a given point along the flight path 12, the required phase correction (in radians) resulting from the two-way path length variation is $\phi$ where:

$$\phi = 2\pi/\lambda \cdot 2\Delta = 4\pi\Delta/\lambda$$

where $\lambda$ is the radiated wavelength. For typical array lengths the one-way path length variation $\Delta$ is approximated as $$\Delta \simeq Y^2/2R$$

where Y is the distance along the flight path measured relative to the array center and R is the range to a given point scatter when the illuminating beam is broadside thereto. Prior art synthetic array processing techniques have formed the focused synthetic array from a plurality of pre-summed unfocused (infinity focus) subarrays with no phase corrections applied within the subarrays. These unfocused subarrays are then combined to form a total focused synthetic array by phase correcting each unfocused subarray pre-sum as their outputs are added vectorially to form the total array. This prior art approach is illustrated in FIG. 3 wherein the $\Delta$'s—i.e. the horizontal one-way displacements of the subarrays from the flight path—indicate one-half the magnitude of the "group" phase corrections which must be applied to the subarray pre-sums as they are combined together to form the total synthetic array. Phase corrections corresponding to twice the value of the $\Delta$'s is necessary to accommodate the actual two-way propagation to, and from a particular ground point scatter.

As shown in FIG. 3, the required quadratic "group" phase correction when combining unfocused subarrays No. 2 and No. 4 corresponds to $2\Delta_2$. A corresponding larger amount, $2\Delta_1$, is required when combining subarrays No. 1 and 5 into the total array. "Group" phase corrections may be thought of as being equivalent to laterally displacing the data perpendicular to the flight path. However, in the system associated with FIG. 3, the phase corrections are applied to the outputs of the running presums as they are added together to form a total array. Thus each presum by itself, before phase correction consists of undisplaced data gathered along the straight-line flight path. A presum can therefore be continually updated by dropping off its oldest information as new data is added. Then by phase correcting (in effect laterally displacing each presum and continually adding them together) line-by-line imagery is continuously formed. However, as may be seen from FIG. 3 when no focusing is applied within a subarray, in order for the phase error to be kept within reasonable limits, the subarray lengths must be made shorter in those subarrays which lie towards the outer extremities of the cord corresponding to the constant phase (constant range to ground scatter). In fact at the extremities of the array, the subarrays have to be at least as short as the azimuth resolution length (d) in order to obtain acceptable side lobe levels.

Figure 4:
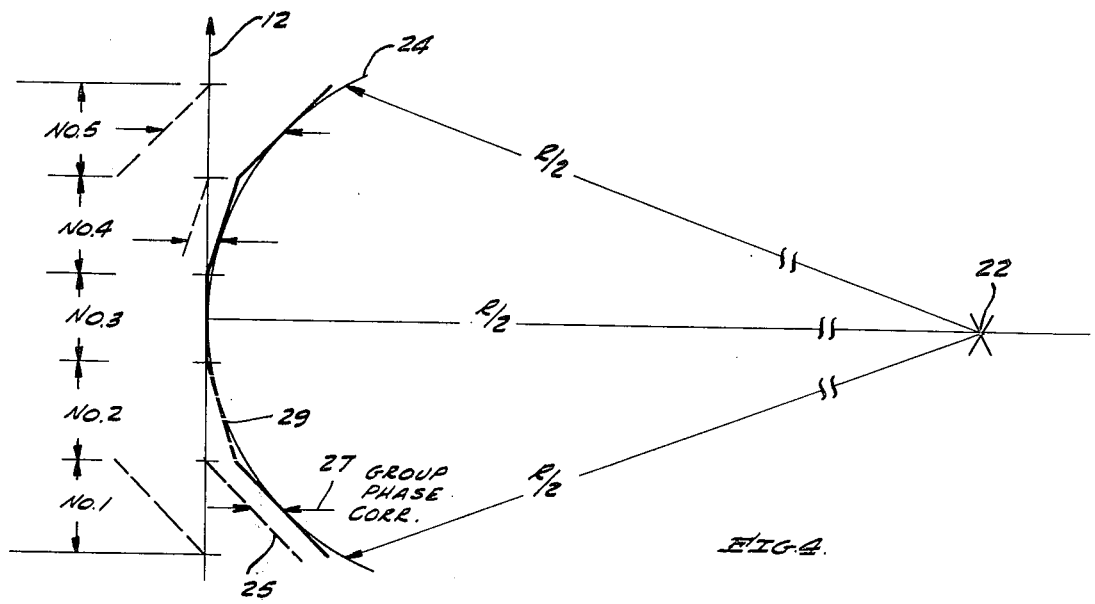
FIGS. 4 and 5 illustrate the linear approximation phase corrections mechanized in accordance with the method and apparatus of the subject invention.

By way of constrast, an important aspect of the subject invention is the method of forming a series of small subarrays with liner (approximate) phase corrections applied within each subarray. The subarray presums are continually updated by dropping off the oldest raw data and by adding the newest. Simultaneously the linearly focused subarrays are continually combined (summed) into a total focused synthetic array by applying an approximate quadratic "group" phase correction to each subarray running presum output as it is fed to the total array summing point. In essence, the approximate equivalent to a number of overlapping, semicircular flight paths segments are built up. As shown in FIG. 4, each of these equivalents to a semicircular flight path segment around a given ground scatter 22 is built up, not as a series of parallel straight-line segments of varying lengths as in prior devices; but instead as a series of equal length non-parallel straight-line segments, each with an appropriate slope so that it can later be displaced, as appropriate, by application of a group "phase" correction to, in effect, bring it tangent to the semicircle of constant range 24. For example, line segment 25 corresponding to subarray No. 1 has a group phase correction 27; while line segment 29 of subarray No. 2 requires no group phase correction.

Figure 5:
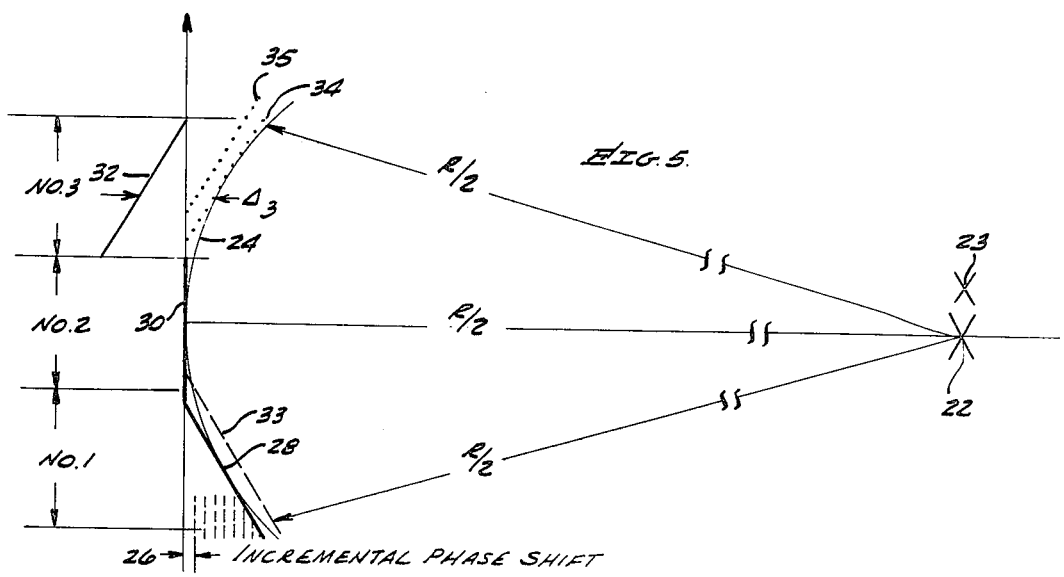

The "formation" of a total synthetic array in accordance with the method of the subject invention is illustrated in FIG. 5. For the sake of clarity of explanation, FIG. 5 illustrates a total synthetic array comprising only three subarrays; a rather untypically small number of subarrays, however, sufficient to illustrate the principles of the subject invention. As shown in FIG. 5, radar data gathered over the straight-line flight path corresponding to subarray No. 1 is progressively recirculated in a processing channel (described hereinafter) which applies an incremental (advancing) phase shift, such as 26, each time the data is recirculated. In effect, for subarray No. 1, each recirculation incrementally displaces the data to the right in FIG. 5. Thus the data at the array beginning, having been recirculated most often has the largest phase shift applied. The later the data along the particular subarray the fewer times it is recirculated and the smaller the applied phase shift. As a result of these phase shifting recirculations, a linearly varying phase correction is imparted to the total subarray No. 1 as shown by slanted line 28. For subarray No. 1, the linearly slope phase correction imparted during the subarray recirculation and accumulation has translated the data to a position tangent to the theoretical semicircular flight path 24. Again it is noted that the phase corrections to be applied actually corresponds to twice the displacement shown since two-way propagation path length changes are involved.

Data gathered along straight-line segment 30 of subarray No. 2 (FIG. 5) has no linear slope phase correction applied since it already lies tangent to the semicircle center. This central subarray data pre-sum, in being combined into the total array, thus requires no "group" translation phase correction.

In a similar manner data gathered along straight-line segment subarray No. 3 has a reverse linear slope (retarding) phase correction progressively applied as the data is accumulated and recirculated—shown by slanted solid line 32 in FIG. 5. When subarray No. 3 is combined (added) with the other subarrays it is, in effect, translated by a single "group" phase correction corresponding to $\Delta_3$ to an equivalent position tangent to its portion of the theoretical semicircular flight path 24. The translated data associated with subarray No. 3 is shown by the dashed line 34 as tangent to the semicircle 24.

The magnitude of the "group" phase correction to be applied when combining subarray No. 3 into the total array is $$2\pi/\lambda \cdot 2\alpha_3$$

or $$4\pi\alpha_3/\lambda$$

To achieve continuous operation, the oldest data is continuously subtracted from each subarray while new data is added at its other end. Meantime, the same linear incremental phase correction (vector rotation) continues to be progressively applied as the data recirculates. It is important to note that in accordance with the subject invention, each subarray is continually updated; and occupies a fixed relative position in the total array. Thus a constant "group" quadratic phase correction may be used in combining each particular subarray data pre-sum into the total synthetic array.

Describing this continuous updating process in more detail, and taking, for example, the subarray No. 1 of FIG. 5, after a complete synthetic array is flown, an immediately subsequent overlapping and updated subarray can be made by merely dropping off the oldest data, adding to subarray No. 1 an increment of the data which originally comprised the beginning of subarray No. 2 and continuing the progressive linear phase shift process. This generates the new subarray 33. The same is done in corresponding fashion in subarrays No. 2 and 3 to generate a new array consisting of subarrays 33, 35 and the section of the flight path 12 lying between their interior ends. This new array is focused on a scatterer 23 at range R, displaced along the flight path an amount corresponding to the azimuth resolution distance. In this manner as the data in the subarray accumulator continues to recirculate, tangent line-segment approximations of successively overlapping semicircles are achieved; each new equivalent semicircular segment having its radius displaced further along the flight path by an amount corresponding to an azimuth resolution element.

Recapitulating the sequence described above, a number of subarrays are formed, each with an appropriate linear-slope phase correction applied depending on its relative position in the total array. In more practical longer array systems there are many more subarrays, each with their appropriate linear phase correction of different slopes applied. Each subarray running pre-sum is at the same time combined on a continuous basis into a total focused synthetic array by adding an appropriate constant "group" quadratic phase correction. Each subarray is continuously updated; hence it always remains in the same relative position with the total array. Each subarray length is constant and can be made relatively long, consistent with the tolerable phase errors which are a major source of azimuth sidelobes.

MECHANIZATION

Figure 9:
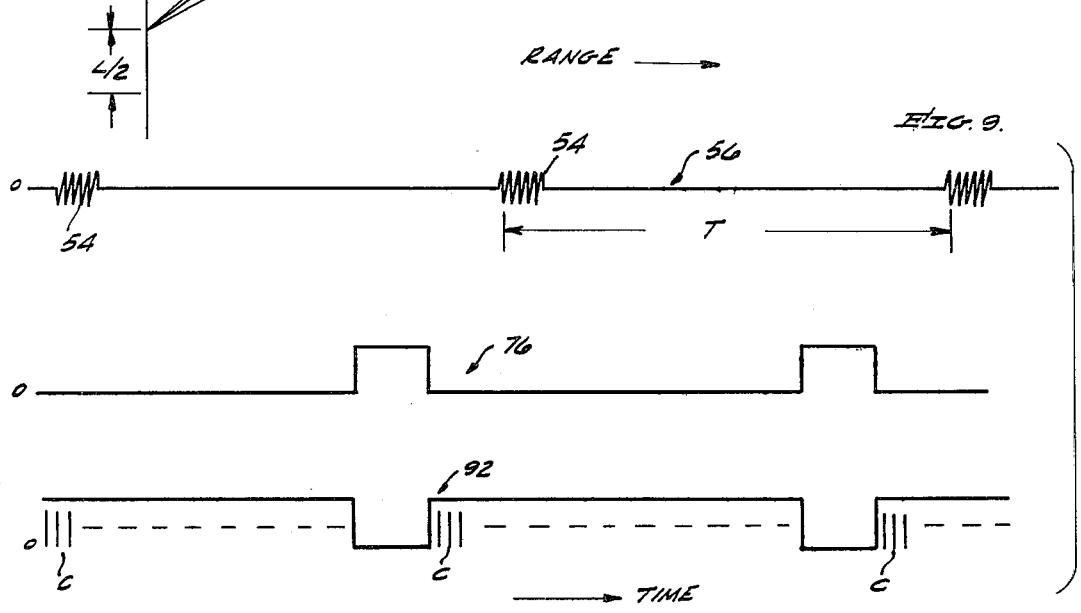
FIG. 9 is a graph of voltage amplitude versus time waveforms for explaining the operation of the system of FIG. 6.

FIG. 6 shows a radar system incorporating a synthetic array processor unit in accordance with the subject invention. Referring now primarily to FIG. 6, a synchronization and control unit 50 applies synchronizing pulses to a conventional, coherent pulse transmitter 52, which in response thereto provides coherent output pulses of RF energy 54 (see waveform 56 of FIG. 9). Synchronization and control devices suitable for unit 50 are well known in the art and may be mechanized, for example, by a high frequency stable master oscillator and associated circuitry (not shown) for multiplying this frequency to the RF frequencies required for the transmitter 52 and as the local oscillator input 62 to the mixer 60. Additionally, circuitry can be provided for counting down the clock pulses from the master oscillator to the pulse repetition frequency. The RF output pulses 54 from transmitter 52 are applied through a duplexer 58 to antenna 14 from whence they are radiated as illuminating beam 15 (FIG. 1).

The RF energy received from scatters within the antenna pattern 15 is applied from antenna 14 through duplexer 58 to a mixer 60. The RF reference signal 62 to the mixer 60 is applied from the synchronizer and control unit 50 and the mixer translates the received RF energy to the intermediate (IF) frequency band. The output signal from mixer 60 is applied to and amplified by an IF amplifier 64 and is then phase detected against an IF oscillator signal 66, also generated in the control unit 50, in a phase detector 68. If the input signal to the phase detector 68 is represented by a vector of length "A" with a phase "B" relative to the phase of the IF oscillator signal 66 (arbitrarily established as a phase standard), then the output of the detector 68 may be represented by the quantity A cos B which is sometimes hereinafter designated "I" for inphase received video.

Similarly, the signal from IF amplifier 64 is also applied to a quadrature phase detector 70. The IF oscillator signal 66 after being phase shifted ninety degrees by a phase shifter 72 is applied as the reference signal to phase detector 70. Hence the output signal of phase detector 70 is translated ninety degrees from that of detector 68 and may be represented by the quantity A sin B—which quantity is sometimes hereinafter designated "Q" for received quadrature video.

The range interval to be mapped is determined by a "shift-in-control" signal applied on a lead 74 from synchronization and control unit 50. For example, the unit 50 may generate a minimum/maximum range gate (see waveform 76 of FIG. 9), and combine ("AND") this gate with clock pulses so as to control the sampling operation of analog to digital (A/D) converters 77 and 78, as well as the operation of buffer storage units 80 and 82. The minimum/maximum range gate 76 may be mechanized by a counter (not shown) which controls a flip-flop circuit (not shown) such that the flip-flop is set when the counter counts a number of master oscillator pulses occurring after the transmitter output pulse, corresponding to the selected minimum range; and is reset when a count corresponding to maximum range has been reached. The shift-in-control signal may then be formed by combining the minimum/maximum range gate signal 76 with clock pulses whose repetition frequency is selected to be approximately equal to the transmitted pulsewidth which has been set to desired range resolution.

Upon the application of the shift-in-control signals analog-to-digital converter units 77 and 78 sample the inphase and quadrature video signals applied from detectors 68 and 70 respectively. Units 77 and 78 convert the video signals to digital words of the desired precision, e.g. each word could comprise 8 bits including a sign bit.

The digital words representative of the value of the inphase and quadrature signals are applied from the converter units on composite leads 79 and 81 to buffer storage units 80 and 82, respectively. As used herein the term "composite lead" means that, although a separate lead for each data bit is utilized, for the sake of clarity of the drawings only one lead per data channel is shown in the figures. It will be understood that in the discussion of the digital circuits hereinafter presented that composite leads are employed where appropriate. It should also be noted that, by appropriate data reforming, the parallel bit readout could be converted into a high speed serial bit readout so that only one wire could be utilized. However, such high speeds are rarely practical in high resolution, long range processors.

The inphase and quadrature binary data words are shifted out of the buffer units 80 and 82 to pre-sum units 84 and 86 on composite leads 88 and 91 respectively. The buffer and pre-sum units are controlled in response to "shift out" control signals (waveform 92 of FIG. 9) applied on a lead 90 from the synchronization and control unit 50.

A mechanization suitable for pre-sum units 84 and 86 is shown in FIG. 7 and will be explained relative to unit 84. The digital data words are shifted out of buffer storage unit 80 on lead 88 in response to the shift out control signal applied from unit 50. These data words from unit 80 are applied to a first input circuit of a summer 94 the output circuit of which is coupled to a switch 96. The switch 96 has a first output circuit coupled on a lead 104I to synthetic array processor 100 (FIG. 6) and a second output circuit coupled to a pre-sum register 102. The output signal of presum register 102 is applied to the second input circuit of summer 94.

The operation of units 84 and 86 in the system of FIG. 6 may be best explained in terms of an arbitrarily selected example. Assuming that the minimum range 18 (FIG. 1) is 48 nautical miles or about 590 microseconds of radar delay, for a twenty-five foot resolution radar a 20 million samples per second analog-to-digital converter may be used for units 77 and 78. Buffer units 80 and 82 could be filled with, for example, 1524 range samples in approximately 75 microseconds for a mapping swath (range interval) of a little over five nautical miles. The buffer units 80 and 82 will read out the stored samples during the interpulse period in response to the shift out control signal, applied on lead 90 from synchronization control unit 50.

Hence, the buffer units store the digitized received data from within the minimum/maximum range interval and for an 800 Hz transmission repetition rate, applies 1524 samples in (1250-75) $\mu$sec., i.e. approximately a 1.3 Mhz rate to the presummer units. The presum ratio is chosen so that approximately one sequence of 1524 output pulses enters the processor 100 each d feet of aircraft travel. For an azimuth resolution of d=25 feet and an aircraft speed of 900 ft./sec., a presum ratio of about 20 to 1, corresponding to 22 feet of aircraft travel is appropriate. For a presum ratio of 20 to 1, the switch 96 (FIG. 7) connects the output of the summer 94 to the 1524 word presum register 102 for nineteen transmission pulse intervals; and connects the summer output circuit to the input of synthetic array processor 100 during the twentieth interpulse interval. This sequence is repeated every twenty transmission periods. Hence the data from the buffer unit is read into the processor 100 at a rate equal to one-twentieth the transmission repetition frequency. For the example of an 800 Hz transmission repetition frequency and a range swath of 1524 ranging intervals per transmission period, the shift-in rate is one-twentieth of the above 1.3 Mhz rate. That is approximately 60,000 words per second are shifted into the processor 100 for each channel—inphase and quadrature. It will be understood that the function performed by the presummers is to process the received data to provide the unfocused sum of a number of consecutive returns associated with each range interval, so as to return the processing rate required by processor 100.

Referring now primarily to FIG. 8, bipolar video, both inphase and quadrature, is applied on a composite lead 104 to a main memory 110. Tapped shift register main memory 110 may be any suitable storage device such as a magnetic drum or a bank of solid state registers which has sufficient capacity to accommodate serially the individual "presummed" range resolution elements in each range sweep, for the total number of presummed range sweeps comprising a synthetic array. In the embodiment of FIG. 8 the data bits comprising each of the inphase and quadrature words are shown and described as being coupled on composite leads, it being understood that in practice a plurality of leads will be required for such coupling; and that the processing elements such as the main memory 110 are paralleled to accommodate the level of quantization, for example, 8 bits each for the "inphase" as well as for the "quadrature" data words.

Output taps are provided on the shift register 110 at the input as well as along the length thereof at points corresponding to each subarray length. For clarity of explanation the embodiment of FIG. 8 is mechanized for a synthetic array comprised of only three subarrays—corresponding to the description presented above relative to FIG. 5. The processor 100 of FIG. 8 includes three processor channels designated 112, 114 and 116, associated with the formation of subarrays 1, 2 and 3 respectively of FIG. 5.

Processor channel 112 includes a summation circuit 118, a phase shifter 120, a multiplier 121, an accumulator register 122, a multiplier 124 and a phase shifter 126. As will be explained subsequently the phase shifter-multiplier combination in the digital mechanization of FIG 8 are mechanized by complex digital multiplications. Separate units such as 121 and 120 are shown in FIG. 8 so that the amplitude and phase correction operation of the invention may be more clearly explained.

One input circuit of the summation circuit 118 is coupled to tap 128 at the input of shift register 110. The input circuit to phase shifter 120 is coupled to an output tap 130 located one subarray length from input tap 128. Phase shifter 120 is coupled to the input of multiplier 121 and the output of multiplier 121 is coupled, such that the sign bit of the data is reversed, to a second input circuit of summation unit 118 thereby providing in effect a subtraction function for the data applied. The third input to the summation unit 118 is applied from the phase shifter 126. The output circuit of the summation unit 118 is applied to accumulator 122 which has a serial length equal to the number of range elements in each interpulse period (1524 in the preceding example). The output signal from accumulator 122 is applied through digital multiplier 124 to pulse shifter 126. The output of phase shifter 126 is connected to the third input of the summation circuit 118, thereby closing a feedback loop through summation circuit 118.

Processor channel 114 is mechanized functionally and structurally in a similar manner to that just described for channel 112, and hence the corresponding units are designated by corresponding reference numerals with the addition of the postscript "a" thereto. For example, the summation circuit of channel 114 is designated 118a, the accumulator 122a, the multiplier 124a, the feedback phase shifter 126a and the "subtract out" input phase shifter 120a. In channel 114 the new data is applied from output tap 130 of the main memory 110; and the data to be subtracted out is applied through phase shifter 120a from an output tap 132. Tap 132 is located one subarray length from output tap 130 along the memory 110.

In a like manner, processor channel 116 is structurally and functionally similar to channels 112 and 114 and corresponding reference numerals have been assigned to corresponding elements with the addition of the postscript "b". The input data to channel 116 is applied from output tap 132 and the old data to be subtracted out of processor loop 116 is applied to the input circuit of phase shifter 120b from an output tap 134 located at the far end of main memory 110.

The subarray data from each processor channel is further processed by a "group" phase shifter and is then summed with the subarrays formed by the other processor channels to provide the total synthetic array. For example, the subarray formed by processor channel 112, wherein an approximately linear phase correction had been applied, receives the "group" phase correction within a phase shifter 136; the data is amplitude weighted by multiplier 138 and then summed with the signals from the other processor channels in an array summation network 140. The output signals from the processor channels 114 and 116 are similarly processed, where appropriate, by group phase shifters 136a and 136b and multipliers 138a and 138b, respectively, prior to being combined with the subarray from processor channel 112 in summation circuit 140 to generate an array output. Each output corresponds to the radar return from one mapping resolution element—i.e. one azimuth cell at one mapping range.

To summarize the operation of the synthetic array processor 100 shown in FIG. 8, at the beginning of an array interval the digitized "range presummed" data from the first range sweep enters the shift register main memory 110 and is stored serially therein. As this data enters the shift register, it is also tapped out in parallel and is applied to accumulator 122 by means of summation network 118. In this manner accumulator 122 is filled along its entire length during the first range sweep processing period.

As the second presummed range sweep of data is applied to the processor 100, it again is applied in parallel to processor 122 through the summation network 118. However, on the second input the data from the first input which had been previously entered into the accumulator 122 is shifted out and fed back through digital phase shifter 124 which imparts an incremental phase shift of $\phi/N$. "N+1" is the number of sweeps (presummed range data samples) comprising a subarray and "$\phi$" is the required total phase correction across the entire first subarray. After the incremental phase shifting resulting from one recirculation, the data from the first range sweep is added (range element by range element) to the corresponding range return for the newly applied second range sweep, thereby creating a partial sum in the accumulator 122.

When the third presummed range sweep is received, the partial sum in accumulator 122 is once again recirculated. This partial sum is now comprised of the data from the first input which will have now been recirculated twice (and thus undergone two incremental phase shifts), and the data from the second input which at this point has only recirculated once, and the data from the third presummed range sweep which at this point has no phase correction since it has not yet been recirculated. In a similar manner on each successive incoming presummed range sweep, one more recirculation of the growing presum accumulation will take place with the oldest data having been recirculated most often and thus progressively phase shifted by a linear incremental amount each time it is recirculated.

Simultaneously with the above-described recirculations and summations, as new data is applied to the synthetic array processor 100, the previously applied data from preceding presummed range sweeps is shifted down the main memory 110 with the newest data being applied in back of the older data. By the time the aircraft 10 (FIG. 1) has flown the first sub-array length, the oldest data has in the intervening time period moved down the shift register to the output tap 130 from whence the data is applied to the accumulator 122a of processor channel 114 associated with subarray No. 2.

On the next subsequent presummed range sweep, not only does accumulator 122a begin to compile its subarray presum accumulation but the oldest data is fed back from output tap 130 through the phase shifter 120 with a reversal of sign such that the oldest data is subtracted out of the recirculation loop of processor channel 112. The phase shifter 120 inserts a phase shift N+1 times the incremental phase shift imparted on each individual recirculation by the phase shifter 126 of processor channel 112. In this manner the phase of the oldest data being subtracted from the accumulated presum of processor channel 112 is substantially equal to the phase of the oldest recirculated data. Ignoring round-off errors associated with the digital mechanization (to be discussed subsequently), by the above just described operation the oldest data is removed from the accumulation loop of processor channel 112 and hence from subarray No. 1 (see FIG. 5).

Examining the operation of processor 100 at a later time just after the second subarray is completed, specifically on the next range sweep thereafter, the oldest data exits from memory 110 on tap 132. At the same time the first sweep of subarray No. 2 is applied to the accumulator 122a and the first sweep of the subarray No. 3 is applied to accumulator 122 through summation circuit 118. Accumulators 122 and 122a now have presums comprising one subarray each. It is noted that older data has been subtracted out of the accumulations stored in units 122 and 122a by means of the subtraction function associated with the phase shifters coupled to output taps 130 and 132 respectively.

The above described process continuous until the total synthetic array is completed. Accumulator 122b is now filled with the third subarray presum; its oldest data has recirculated and has been phase shifted N times, its next-to-oldest data (N−1) times, etc., when N corresponds to the number of sweeps in a subarray. Phase shifter 126b has imparted a progressive linear phase lag on each recirculation which is equivalent to shifting data further to the left in FIG. 5 (further away from the scatter 22) and when the subarray is complete, its data is in effect parallel to corresponding tangent line 34 in FIG. 5.

At the completion of a total synthetic array, accumulator 122a is now filled with the middle subarray but since it is associated with the central position in the array, phase shifter 126a needs to impart zero phase shift during the multiple recirculations. For this same reason, phase shifter 120a in the subtract channel from tap 132 needs to impart zero phase shift in removing the oldest data from accumulator 122a. Phase shifters 126a and 120a were shown in FIG. 8 even though they impart no phase shift in the special case of the central subarray so that the symmetry (conceptual and structural) of the processor channels would not be distorted by the special case where the value of the required phase shift is zero.

In corresponding fashion, phase shifter 126 has imparted a progressive phase lead which in effect arranges the data therein parallel tangent line 28 in FIG. 5.

When the total synthetic array is completed, the pre-sums of all subarrays accumulators are available through "group" phase shifters 136, 136a and 136b to array summation circuit 140. The output of circuit 140 is thus the first line of correlated imagery. By this time data has just totally filled the main memory shift register 110 and is available at its output end to subtract the oldest data from accumulator 126b on the next sweep.

From this point on, each new range sweep results in a new line of imagery output. Each accumulator has its oldest (most often recirculated) data subtracted out by the respective subtract feedback channels. Simultaneously a new range sweep of data enters each accumulator to maintain an upgraded set or pre-sum of data comprising a new subarray.

As described so far, the function of the multipliers 124, 124a, and 124b in the accumulator feedback channels has not been explained. These just listed multipliers provide amplitude weighting which is necessary to minimize azimuthal sidelobes. This is accomplished by the gains thus chosen for these multipliers; for example, the newest data in accumulator 122 (upper end of the array in FIG. 5) should have lesser (amplitude) weight than its oldest most recirculated data. Hence, multiplier 124 has a gain slightly over unity, so that the newer (less recirculated) data will have less weight.

In similar fashion the multiplier 126b in channel 116 is set to slightly less than unity gain. This will give least amplitude weight to the oldest recirculated data, i.e., the lower end of the array of FIG. 5. A gain of unity would be applied in the central subarray accumulator feedback channel where uniform weighting is desired.

The multiplier units 138, 138a and 138b coupled to summation circuit 140, serve to properly amplitude weight each subarray. The multiplier units 121, 121a and 121b contain the constants in units 126, 126a and 126b raised to the N+1st power respectively in order to correctly subtract off the oldest data in each subarray.

In order to more clearly explain the inphase and quadrature aspects of synthetic array processor 100, channel 112 and its associated input and output circuitry are shown in greater detail in FIG. 10. The output data words from pre-sum units 84 and 86 (FIG. 6) are coupled on leads 104I and 104Q to inphase and quadrature sections respectively, of the main memory 110. It is noted that the elements shown in FIG. 10 have been assigned the same reference numerals as corresponding elements of FIG. 8 with the addition of the letter "I" or "Q" for identifying the inphase and quadrature sections.

Each section of main memory 110, inphase and quadrature, has sufficient capacity to accommodate the levels of quantization involved, for example, 7 bits plus a sign bit. Inphase and quadrature data words are applied from output taps 128I and 128Q to inphase and quadrature sections respectively, of summation circuit 118. Summation circuit 118 may be comprised of two conventional summation devices, one for processing the inphase components of the signals supplied thereto and the other for processing the corresponding quadrature signals. In a similar manner accumulation register 122 may comprise two conventional shift registers operating in parallel; and summation circuit 140 may comprise two identical conventional summation sections for forming the sums of the inphase and quadrature data words provided from channels 112, 114, and 116.

The series combinations of a phase shifter and a multiplier shown in FIGS. 8 and 10 may be mechanized by complex digital multipliers which multiply the applied complex number (inphase and quadrature components), by a complex number, such as $Ae^{j\phi}$, equal to $A \cos \phi + j \sin \phi$, stored therein. For example, if the applied data word were represented by the signal $S_{144}$ and the desired multiplier by the complex number $S_{142}$, then the complex multiplication would represent the phase shifting and amplitude scaling of the former signal by an amount indicated by the latter signal. This may be more clearly explained by first recalling that the product of two complex numbers, complex numbers $S_{144I} + j S_{144}$ $_Q$ and $S_{142I} + j S_{142Q}$, is $S_{144I} S_{142I} - S_{144Q} S_{142Q} + j(S_{144Q} S_{142I} + S_{144I} S_{142Q})$ where $S_{144I}$ and $S_{144Q}$ are the inphase and quadrature component terms of complex number $S_{144}$, and $S_{142I}$ and $S_{142Q}$ are the inphase and quadrature terms of complex number $S_{142}$. $(S_{144I} S_{142I} - S_{144Q} S_{142Q})$ and $(S_{144Q} S_{142I} + S_{144I} S_{142Q})$ are the inphase and quadrature terms respectively of the complex product of these two complex numbers. These inphase and quadrature terms of the product may be mechanized by sections 149I and 149Q of FIGS. 11 and 12 respectively.

Figure 11:
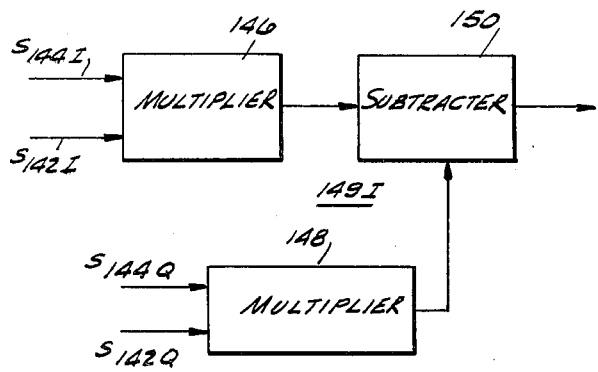
FIG. 11 and 12 are block diagrams of inphase and quadrature multiplier units respectively, which may be used in the processor of FIG. 8, such as unit 124.
Figure 12:
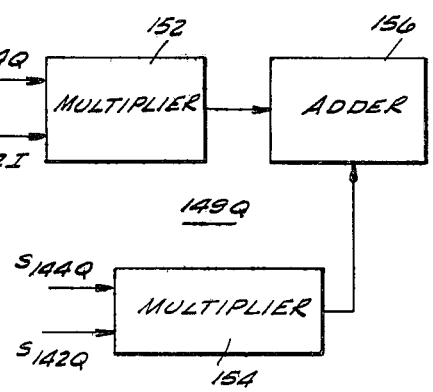

As shown in FIG. 11 multiplier units 146 and 148 which may be conventional digital multipliers, form the terms $S_{144I} S_{142I}$ and $S_{144Q} S_{142Q}$ respectively, and the latter term is subtracted from the former term in a subtraction unit 150 to form the inphase term of the complex product. Similarly, as shown in FIG. 12, multiplier units 152 and 154 form the terms $S_{144Q} S_{142I}$ and $S_{144I} S_{142Q}$ respectively and these terms are combined in adder 156 to form the quadrature term of the complex product.

Hence, the inphase and quadrature data signal are essentially processed in parallel and as mentioned previously, it should be understood that where appropriate the leads shown in the drawings are composite leads for parallel processing the plurality of bits associated with each of the inphase and quadrature signals. Also, to maintain the clarity of the drawings synchronization (timing or clock pulses) are not shown applied to each of the respective units comprising processor 100. However, it will be readily apparent to those skilled in the art that the "shift out" control signals applied on lead 90 from unit 50 (FIG. 6) may be used to synchronize the necessary internal timing functions of the digital processing elements shown in the figures.

In digital mechanizations of the subject processor one additional important consideration is the reduction of "round-off" error accumulations. It will be recalled that after N recirculations data is subtracted out of each of the processor channels. N range sweeps are used to form each subarray, and the subtraction process continuously updates the subarray channels by removing the oldest data and adding new data. For example, in channel 112 after N+1 circulations the oldest data word is subtracted out by the signal applied on lead 119. Due to the practical limitation on the total number of quantization levels (bits) employed, when the oldest data is subtracted out of each subarray processing loop a gradual error accumulation results. This is because the sum digital data in the processor loop had been slightly approximated and hence is not exactly equal to the data subtracted. For this reason, the subject invention includes a mechanization for utilizing dual "subchannels" in each subarray processing channel.

One mechanization adapted for reducing "round-off" error accumulation is illustrated in FIG. 13 relative to channel 112. Due to the structural and functional similarities between channels 112, 114 and 116 it will be apparent that channels 114 and 116 may be mechanized for "round-off" error reduction in an identical manner to that shown in FIG. 13 for channel 112. Referring now primarily to FIG. 13, subchannels A and B are effectively coupled in parallel between a Y switch 204 and an X switch 200. The output signal of the X switch 200 is applied through group phase shifter 136 and multiplier 138 to the array summation circuit 140 as described previously relative to FIG. 8.

Subchannels A and B each include the elements for providing subarray imagery as discussed previously relative to FIG. 8, and corresponding elements are given in the same reference numeral followed by the letter A or B to identify the subchannel. Additionally, a W switch 202 is coupled between summation circuit 118A and accumulator register 122A; whereby the output of the switch is controlled to apply either the data from input tap 128 or from summation circuit 118A to the accumulator register 122A. Also, Y switch 204 is coupled between multiplier 121 and summation circuits 118A and 118B. A Z switch is coupled between summation circuit 118B and accumulator register 122B. The function of the Z switch is to couple either the output signal tap 128 or the output of summation circuit 118B to accumulator register 122B.

The subchannels A and B are used in interleaved fashion so that while one subchannel is providing imagery data the other subchannel may be cleared and "built back up" (reinitialized). In this manner after each 2N processing cycles the accumulated round-off errors in one channel are cleared.

To explain the operation of the dual subchannel mechanization of FIG. 13 first assume that at some time t channel A had just built up to the point where it is providing subarray data after having been cleared, then for the next (N−1) range sweeps (transmission periods) the output data will be provided from the A subchannel, while the B subchannel is cleared and reinitialized. This process is outlined in Table I and will be summarized in the following description of one cycle (2N range sweeps) of the interleaved process. In Table I the columns headed W, X, Y and Z indicate the coupling provided by the respective switches during the different processing steps. For example, at time t switch W coupled unit 118A to unit 122A.

TABLE I

Operation of Parallel Processing Loop
(for Reduction of Error Build-up)

| Range Sweep | W | Y | Z | X | Imagery from Subchannel |
|---|---|---|---|---|---|
| t | 118A to 122A | 118A to 121 | 128 to 122B | 122A to 136 | A |
| t + 1 through t + (N−1) | 118A to 122A | 118A to 121 | 118B to 122B | 122A to 136 | A |
| t + N | 128 to 122A | 118B to 121 | 118B to 122B | 122B to 136 | B |
| t + N + 1 through t + N + (N−1) | 118A to 122A | 118B to 121 | 118B to 122B | 122B to 136 | B |
| t + 2N | 118 to 122A | 118A to 121 | 128 to 122B | 122A to 136 | A |

Referring now to FIG. 13 and Table I, at time t it is assumed that channel A has just commenced providing imagery data. Hence, at this time channel A is in the normal processing configuration discussed relative to the single channel embodiment of FIG. 8. In particular W switch 202 is set such that the output of summation circuit 118A is coupled to accumulator register 122A and Y switch 204 is set so that the output signal for multiplier 121 is applied to summation circuit 118A; whereby the oldest data from the A subchannel is subtracted as described hereinabove. During range sweep t, Z switch 206 of channel B is set such that the signal from tap 128 is applied to the accumulator register 112B. Hence, during range sweep t the accumulator register 122B is cleared of the previously stored data which had been contaminated by round-off errors, and a new range sweep set of data applied through Z switch 206. During range sweeps t+1 through t+(N−1), switches W and Y are retained in the same position as described for range sweep t but Z switch now is set so that the output of summation circuit 118B is applied to accumulator register 122B. It is noted that during the N range sweeps just discussed channel B had been cleared during the first range sweep and reinitialized during the remainder of these range sweeps. No data is subtracted out of the B loop during this period because the clearing action at step t removed all of the old data. Hence, at the end of range sweep t+(N−1) a subarray is built up in the B channel and the X switch is changed to apply the output of the B subchannel to phase shifter 136; while the A channel is cleared and reinitialized. This reinitializing involves coupling the new data from tap 128 through W switch 202 and coupling the output of multiplier 121 to the B channel summation circuit 118B during the range sweep t+N. For range sweeps t+(N+1) through t+N+(N−1) the operation of the circuit and of switches remain unchanged except that the W switch is changed after the t+N range sweep to couple the output from summation circuit 118A to accumulator register 122A. This completes one cycle of operation of the dual subchannels and at range sweep t+2N the sequence is repeated with the A channel having been cleared and reinitialized, coupled to summation circuit 140, and the B channel being cleared and built up.

In the interest of clarity of the drawing, the control signals to the switches shown in FIG. 13 are not shown nor is the logic circuit which provides these control signals. However, it would be apparent to one skilled in the art how to implement the logic shown in Table I so that the switches are controlled as there indicated. For example, the logic circuit could include a counter that counts 2N range sweeps and then resets itself. The transmission synchronization pulses from unit 50 of FIG. 6 could be applied to this counter as an indication of the occurrence of the range sweep periods. The output count from the counter could be used to set and reset individual flip-flops associated with each of the switches of FIG. 13, whereby the switches are controlled to the positions indicated in Table I.

Figure 14:
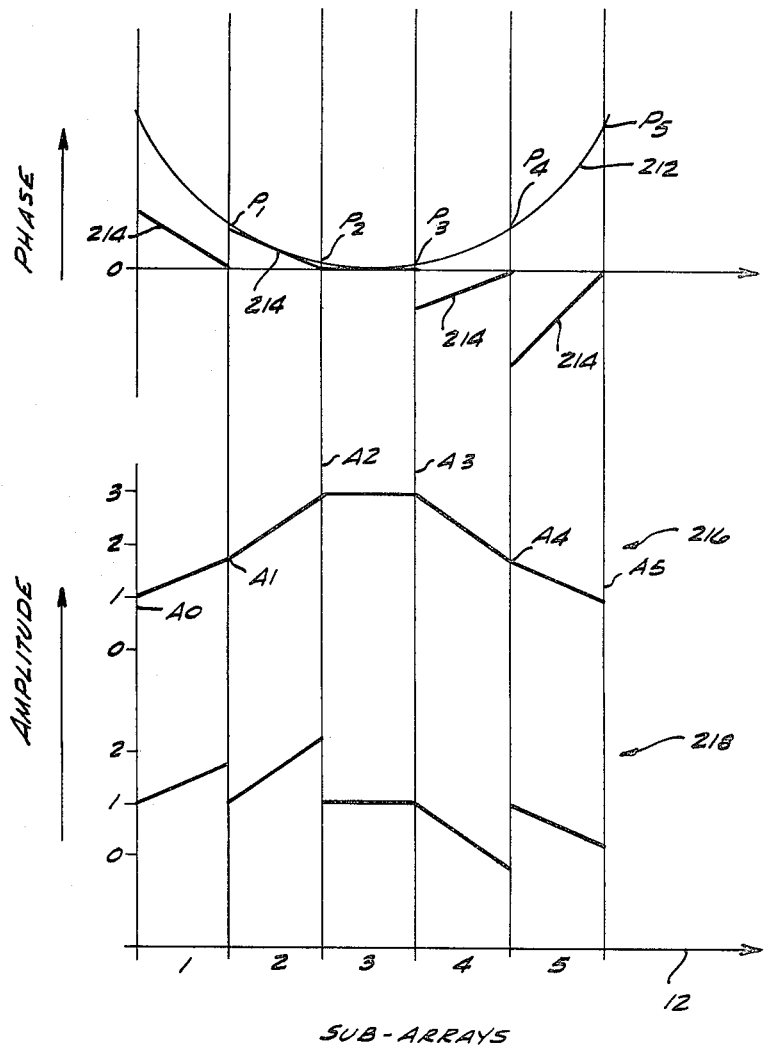
FIG. 14 is a graph depicting the amplitude and phase relationship between the various subarrays comprising a synthetic array, for explaining the "linear" and "group" processing functions of the subarray channels.

The operation of the processor 100 may be summarized by reference to the amplitude and phase functions shown in FIG. 14. A waveform 212 depicts the desired phase correction over the total array (comprised by five subarrays). As shown in waveform 212, the phase at the end of each subarray is designated by the letter $\rho$, with a subscript corresponding to the associated subarray. For example, $\rho_k$ is the phase at the end of the kth subarray and $\rho_1$ is the phase at the end of the first subarray. A waveform 214 depicts the linear phase slope imparted to the data within each subarray, wherein the phase change per presummed pulse in the kth subarray channel is defined as $\psi_k$ where $\psi_k$ is equal to $[\rho_k−(\rho_k−1)]/N$. N is equal to the number of presummed range sweeps comprising a subarray. It is noted that in the above described embodiment the phase correction within each subarray channel starts at the same phase value, such as zero degrees arbitrarily selected for illustration in FIG. 14; and the subarrays are effectively transposed to a position tangential to the phase curve of constant range 212 by means of the group phase shifters, such as phase shifter 136 shown in channel 112 of FIG. 8.

Waveform 216 of FIG. 14 illustrates an arbitrarily selected amplitude weighting function made up of approximately straight-line segments over each subarray, wherein the relative value at the end of the kth subarray is designated $A_k$ and the value at the end of the first subarray is designated $A_1$. For any given subarray the value of the amplitude weighting coefficient is $B_k$, where $B_k$ is equal to the Nth root of $A_k/A_{k−1}$. The amplitude weighting applied within each channel has the proper slope as required by the associated amplitude weighting function 216 of FIG. 14, for example. In the mechanization of FIG. 8, amplitude weighting within the subarrays is applied by the multipliers coupled in the feedback path of each channel. However, in the mechanization of FIG. 8, the weighting for each subarray starts at the same initial value and the group multipliers, for example group multiplier 138, are required to effectively transpose the amplitude weighting function so that the desired waveform may be recreated.

Again it is noted that a combination of amplitude weighting and phase shifting may be mechanized by a single complex multiplier. For example, the function $B_k e^{j\psi k}$ which is shown in FIG. 8 as being provided by the combination of a feedback multiplier and phase shifter would in practice be mechanized by a single complex multiplier performing the same function.

The output phase shifter for each processing channel such as phase shifter 136, for example, has been described as applying for the kth channel processor the necessary phase shift $\phi_{k−1}$ so that the phase shift indicated by waveform 212 is obtained by transposing the segments of waveform 214 to follow the phase pattern of waveform 212. $\phi_k$ is defined as $N \cdot X_k$. Similarly, the output multiplier in each processing channel such as multiplier 238, for example, applies a multiplication constant $A_{k−1}$ to the data from the kth subarray channel, thereby transposing the weighting function segments shown in waveform 218 so they follow the pattern of the desired waveform 216.

The mechanization of FIG. 15 effectively provides for the group amplitude and phase corrections to be applied at the input side of the processor channels. For applications such as synthetic array mapping where the phase and amplitude function may be approximated by continuous line segments certain economies in mechanization costs may be realized, by the mechanization of FIG. 15.

SECOND EMBODIMENT

Reference is now directed primarily to FIG. 15 which shows a processor wherein the group phase and amplitude functions are provided at the input to the linear phase and amplitude channels, instead of at the outputs of these channels. In FIG. 15 once again a processor having only three subarray channels is illustrated in the interest of preserving the clarity of the drawings. However, it will be understood that any number of subarray channels may be incorporated by merely duplicating the channels shown and combining their outputs in summation circuit 140.

The subarray channels corresponding to subarrays 1, 2 and 3 (FIG. 5) are labeled 113, 115 and 117 respectively, in FIG. 15. Those elements which provide corresponding functions in the different subarray channels are given like reference numerals with the elements of channel 115 delineated by the letter "a" and those of channel 117 by the letter "b". Also, in comparing the mechanization of FIG. 15 to that of FIG. 8 it will be noted that in FIG. 15 the amplitude multiplier and phase shifter combinations, such as elements 124 and 126 of FIG. 8, are shown in FIG. 15 as a single complex multiplier unit, as these functions would be mechanized in practice. They were shown separately in FIG. 8 so that the amplitude and phase operations of the subject invention could be more clearly delineated.

Considering now channel 113 of FIG. 15, the digitized data words are applied from the input tap 128 of the shift register memory 110 to one input circuit of summation circuit 118. The output from unit 118 is applied to accumulator register 122, and the output therefrom is applied to the summation unit 140. Also, the output data from accumulator register 122 is operated upon by complex multiplier unit 125 wherein the incremental amplitude weighting function $B_1$ and the incremental phase shift $\psi_1$ is applied during each circulation. Also coupled to summation circuit 118 is the output of complex multiplier unit 127 which functions to subtract the oldest data from the recirculation loop of channel 113. It will be recalled from the preceding discussion that the amplitude function $A_1$ applied to the data from the tap 130 of memory 110 is equal to the $N+1$st power of $B_1$ and the phase function $\phi_1$ is equal to $(N+1)\psi_1$. Therefore, as in the previous mechanization the oldest data is subtracted out of the recirculating loops as new data is added thereto.

Comparing FIG. 15 to FIG. 8, it will be noted that in the embodiment of FIG. 15 the input data to the second channel 115 is not applied directly from the second tap of the register 110, but rather from the output of complex multiplier 127. As discussed above relative to FIG. 14 this change in the amplitude and phase of the data applied to the successive channels results in the input to the kth already possessing the amplitude and phase history of the preceding stage. The embodiment of FIG. 15 in effect applies the group amplitude and phase corrections to the input of the subarray channels, rather than at the output as in the embodiment of FIG. 8.

It will be noted that the complex multiplier coupling the kth output tap of the shift registers to the subarray channels applies its signal to the kth channel so that the sign bit is reversed, and the oldest data is subtracted out of the loop. The output of the kth multiplier is applied to the summation circuit of the $K+1$ channel so that new data of the proper initial amplitude and phase is added to the loop. For applications such as synthetic array processors where the required amplitude and phase functions are continuous the complex multipliers of the input stages may be as shown in FIG. 15. However, for a general processor where it may be desired to mechanize a noncontinuous function, parallel multipliers would be used between channels. One of said multipliers would be used to subtract data from one loop and the other for shifting the amplitude and phase of the data added to the next processing loop. The advantage of using the mechanism shown in FIG. 15 is that only two multipliers are required per subarray instead of the three required by the mechanism of FIG. 8. In both cases, one more multiplier per subarray is required if the round-off error reducing circuitry of FIG. 13 is incorporated.

DEPTH OF FOCUS AND SQUINT ANGLE CONSIDERATIONS

Figure 16:
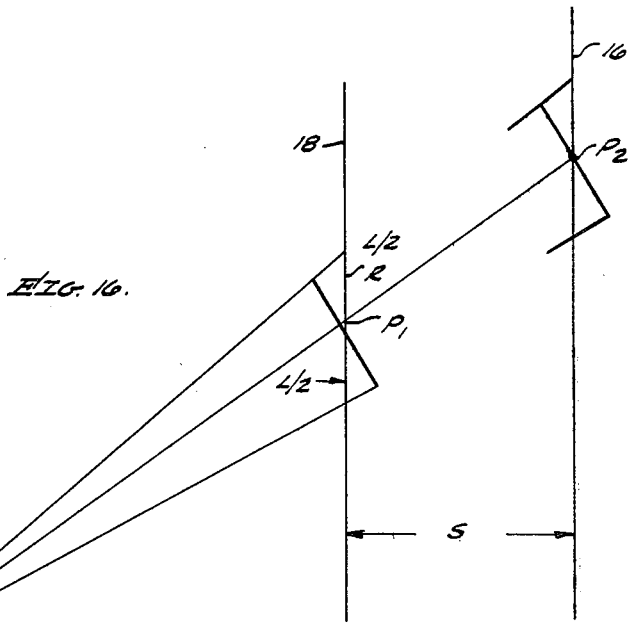
FIG. 16 is a graph of a "squint" angle mapping geometry for explaining the "depth of focus" and "range closure" features which are compensated for by the embodiment of FIG. 17.

The preceding explanation was concerned primarily with applications involving "broadside" mapping with swath widths such that problems relating to range closure could be ignored. However, for applications involving squint angles substantially away from broadside (90°), phase corrections must be made whenever the time variation of range (R) exceeds an appreciable fraction of a radar wavelength; and range closure corrections are required whenever the radar range variations exceed an appreciable fraction of a range resolution element. These considerations are illustrated in FIG. 16 wherein the range returns ($\Delta R$) required to map a swath width (S) is $S \csc \theta$, due to the distance across the swath and is $(L \cos \theta)/2$ at each extreme due to the range closure of points $P_1$ and $P_2$. Hence, $\Delta R = S \csc \theta + L \cos \theta$, where L is the length of the synthetic array gathering path, and $\theta$ is the squint angle measured with respect to the flight path. In addition to range closure, another factor must be taken into account for large values of swath width S at any squint angle. This is depth of focus, i.e. the region wherein a single phase program (curve 24 of FIG. 4) can be used. In FIG. 4, the shape of curve 24 depended on the range to a given scatterer. It can be shown that there is a depth of fixed focus region (25) of depth on the order of $M = d^2/\lambda$ on each side of a scatterer such as 22 where the same phase function 24 provides acceptable azimuth sidelobe levels. Here d is the azimuth resolution and $\lambda$ is the radar wavelength.

The mechanization of FIG. 17 utilizes programmable phase shifting and amplitude weighting functions to overcome the phase defocusing aspects of both of the just discussed effects. Programmable data delay, such as selectable output taps from the main memory 110, is used to compensate for the radar time variations (range closure) caused by mapping at other than broadside "look" angles.

It should be noted that the mechanization in FIG. 17 also could include the dual subchannel features shown in FIG. 13 for the reduction of digital "round-off" errors. This two subchannel mechanization was not shown in FIG. 17 to maintain the clarity of the drawing, it being understood that parallel subchannels could readily be incorporated therein.

Reference is now directed primarily to FIG. 17 which shows the kth channel or stage of a processor adapted for focusing across the swath width (range dimension) and for varying the data processing time delay as a function of range closure along the array length. In FIG. 17 the portions of the main memory 110 associated with the K-1 and K stages of the processor are shown. Momentarily ignoring the function of switch 230 it may be seen that the operation of complex multiplier 127 (K-1), summation circuit 118K, accumulation register 122K, and complex multiplier 125K are similar to that described during the explanation of FIG. 15.

Register 238 which may be a 10-stage recirculating shift register, for example, relates to the limited depth of focus problem. For example, for $d = 5$ feet and $\lambda = 0.1$ feet, the processor maintains a desired phase tolerance for 500 feet intervals along the swath width. For a 5,000 foot mapping swath 10 coefficients would be stored in the register 238 and periodically applied to multiplier 125K at intervals along the interpulse processing period (each range sweep). In this manner the amplitude and phase of the complex multiplier 125K is varied as a function of range to obtain the desired mapping resolution. Varying the amplitude of the weighting function $B_k$ allows for an increase or decrease of resolution. Hence, a constant resolution across the swath width may be obtained by programming the gain and phase of the complex multipliers. Multiplier 127K has its coefficient programmed to track that of multiplier 125K according to the previously described relationship between $A_k$ and $B_k$, and between $\phi_k$ and $\psi_k$.

At squint angles unequal to 90 degrees, and at the end of long arrays even at broadside look angles, range closure due to the relative position of the scatter as the aircraft moves along the flight path presents problems.

This effect may be compensated for by programmable switches 230, 234 and 236. Switch 230 is mechanized to sequentially connect one of a plurality of input taps from memory 110 to complex multiplier 127(K-1) as a function of the variation in the radar time between any particular point scatter and the particular segment of the array. The switch 230 in association with the plurality of input taps thereto operates as a range closure interpolator, which switches between the plurality of taps in response to a control signal $N\tau_{k-1}$; where $N\tau_{k-1}$ is a function of the variation of radar range to the center of the particular subarray, over the entire array length.

In a similar manner switch 236 acts as the range closure interpolator for the kth stage and operates in an identical manner to the K-1 interpolator.

To synchronize the data being recirculated within each channel as a function of range closure, each channel has a feedback interpolator such as shift register 232 and switch 234. For example, shift register 232 may be two stages long and the switch 234 programmed as a function of the range delay variation (range closure) per range sweep ($\tau_k$).

Further, it should be noted that the position of the range swath, i.e. the distance of the mapping interval from the flight path, the width of the swath or the squint angle may be varied in accordance with the principles of the subject invention since the amplitude weighting, phase correction, and range closure circuits may be dynamically programmed as the function of said variations in the swath width or look angle.

Thus, there has been described an improved synthetic array radar processor which provides high resolution long range continuous line-by-line imagery; which is adaptable to digital implementation without significant degradation due to round-off error accumulation; and which is adaptable to all range focusing and operation at varying squint angles. Although only a few selected preferred embodiments have been described herein with particularly, it is understood that many changes or modifications thereto may be made without departing from the scope of the subject invention. In particular, although primarily digital mechanizations were considered herein, it will be apparent to those skilled in the art that the principles of the invention are readily adaptable to implementation by analog techniques or a combination of analog and digital techniques. Also, although the disclosed embodiments all include amplitude weighting for azimuth (spectral) sidelobe reduction; it will be understood that the amplitude weighting features could be deleted from less sophisticated embodiments of the invention. Further, it is noted that for clarity of explanation of the fundamental principles of the invention, the phase adjustment of the signals forming each subarray has been described as effectively transposing each subarray to be tangent to be the associated portion of the cord of constant range. It will be understood, however, that for minimum mean square phase error that the values (coefficients of the complex multipliers) of the phase shifts associated with each subarray may be modified slightly from the value for "tangential phase curve" fitting to obtain a "best fit" approximation to the cord of constant range; and that as used herein "tangential phase curve" fitting includes this "best fit" modification.

What is claimed is:

1. The method of processing radar signals to provide synthetic array, line-by-line imagery data in the form of signals produced during each processing period of recurring cycles of said periods, said method comprising the steps of:

forming a plurality of subarray signals during each processing period; each said subarray signal being formed by applying an incremental phase adjustment to the subarray signal from the corresponding processing period of the preceding processing cycle, and modifying the resultant signal as a function of said radar signals to compensate for changes in the corresponding subarray since the corresponding processing period of the preceding cycle;

combining said plurality of subarray signals formed during each processing period to form an imagery data signal; and repeating said forming and combining steps for each processing period of each cycle; whereby imagery data corresponding to each one of a plurality of range resolution elements is formed during a corresponding processing period of each cycle and subsequent lines of imagery data are formed during subsequent processing cycles.

2. The method of claim 1 wherein said forming step includes successively applying an incremental phase adjustment onto the accumulated sum of the data forming each subarray signal to achieve an approximately linear phase focusing of the data forming each subarray signal; and said combining step includes applying a group phase adjustment to each subarray signal and then forming the sum of said group phase adjusted signals.

3. The method of claim 2 wherein said step of applying an approximately linear phase adjustment includes applying during each processing period an incremental phase adjustment of such a value that each subarray signal is formed to in effect be parallel to the tangent to the cord of constant range of the corresponding subarray.

4. The method of claim 3 wherein said group phase adjustment step includes applying a phase adjustment to each subarray signal such that each subarray signal is effectively tangent to the cord of constant range of the corresponding subarray.

5. The method of claim 1 wherein said modifying step includes adding the newest radar signal associated with a particular subarray and range element to and subtracting the oldest data from the resultant signal.

6. The method of claim 1 wherein said forming step includes applying a phase adjustment of an approximately linear slope onto the accumulated sum of radar signals forming each subarray; said modifying step includes adding the newest radar signal associated with the particular subarray and range element modified by a group phase adjustment to, and subtracting the oldest data from, the resultant signal; and said combining step includes forming the vectorial sum of the plurality of subarray signals formed during each processing period.

7. The method of claim 6 wherein said step of applying an approximately linear phase adjustment includes applying during each processing period an incremental phase adjustment of such a value that each subarray signal is effectively tangent to the corresponding cord of constant range of the corresponding subarray.

8. The method of claim 1 wherein said forming step includes storing the subarray signals of the preceding processing cycle in a shift register memory having M x N x K stages, where M is the number of range elements being mapped, N is the number of subarrays forming each array, and K is the number of presummed radar sweep forming each subarray.

9. The method of claim 1 wherein said forming step further comprises applying an incremental amplitude adjustment to the subarray signal from the corresponding processing period of the preceding processing cycle.

10. The method of claim 9 wherein said forming step includes applying phase and amplitude adjustments having approximately linear slopes onto the accumulated sum of the radar signals forming each subarray signal; and said combining step includes applying a group amplitude and phase adjustment to each subarray signal and forming the sum of said group amplitude and phase adjusted signals.

11. The method of claim 9 wherein said forming step includes applying an approximately linear phase and amplitude slope onto the accumulated sum of the radar signals forming each subarray; said modifying step includes adding the newest radar signal associated with the particular subarray and range zone modified by a group phase and amplitude adjustment to, and subtracting the oldest data from, the resultant signal; and said combining step includes forming the sum of the plurality of subarray signals formed during each processing period.

12. The method of claim 9 wherein the value of the incremental phase and amplitude adjustments associated with any given one of the plurality of subarray signals is varied as a function of the processing period within each processing cycle.

13. The method of claim 12 further comprising varying the relationship between the time of receipt of the radar signals and the processor period within said recurring cycles in which said radar signals are used to modify said resultant signal.

14. The method of claim 1 wherein the value of the incremental phase adjustment associated with a given one of said plurality of subarrays is varied as a function of the processing period within each processing cycle.

15. A device for processing radar signals to provide synthetic array line-by-line imagery data in the form of signals produced during each processing period of recurring cycles of said periods, said device comprising:

means for forming a plurality of subarray signals during each processing period; said forming means including a plurality of processor channels one of which is associated with each subarray signal, each processing channel including means for applying an incremental phase adjustment to the subarray signal of the corresponding period of the preceding processing cycle, and means for modifying the resultant phase shifted signal as a function of said radar signals to compensate for changes in the associated subarray between processing cycles; and means for combining said plurality of subarray signals formed during each processing period; whereby data associated with each one of a plurality of range resolution elements is formed during a corresponding period of each cycle and subsequent lines of imagery data are formed during subsequent processing cycles.

16. The device of claim 15 wherein said means for applying an incremental phase adjustment includes a recirculating path having a phase shifter, whereby an approximately linear phase slope is applied to the accumulated sum of the radar signals forming each subarray signal; and said means for combining includes a different group phase shifter coupled to each processor channel output, and means for summing the output signals of said group phase shifters.

17. The device of claim 15 wherein each processing channel includes an accumulator memory device for storing the subarray signals from the preceding processing cycle, a summation circuit, and an incremental phase shifter coupled between the output of said accumulator memory device and said summation circuit; and said means for modifying includes means for applying the newest radar data associated with the particular subarray to the summation circuit and means for applying the oldest data comprising the corresponding subarray signal of the preceding cycle to the summation circuit, so that the newest radar data is added to and the oldest data is subtracted from the output signal of said phase shifter.

18. The device of claim 17 wherein said radar signals are stored in a main memory device having M x N x K stages and N+1 output taps, where M is the number of range elements being mapped, N is the number of subarrays forming each array, and K is the number of presummed radar sweeps forming each subarray; said means for applying the newest radar data includes means for coupling said summation circuit to one of said taps; and said means for applying the oldest data includes means for coupling said summation circuit to the preceding one of said taps.

19. The device of claim 17 wherein said means for applying the oldest data includes a phase shifter having N times the phase shift of said associated incremental phase shifter.

20. The device of claim 19 wherein said means for applying the newest data includes a phase shifter having N times the phase shift of the incremental phase shifter in the preceding channel.

21. A device for processing radar signals to provide synthetic array line-by-line imagery in the form of data signals sequentially formed during each processing period of recurring cycles of said periods, said device comprising:

means for forming a plurality of subarray signals during each processing period; said forming means including a plurality of processor channels at least one of which is associated with each subarray signal, and each processing channel includes means for applying an incremental amplitude and phase adjustment to the corresponding subarray signal from the corresponding period of the preceding processing cycle, and means for modifying the resultant amplitude and phase adjusted signal as a function of said radar signals to compensate for changes in the associated subarray since the preceding processing cycle; and means for combining said plurality of subarray signals formed during each processing period to form focused imagery data signals; whereby data corresponding to each one of a plurality of range resolution elements is formed during a corresponding process period of each cycle and subsequent lines of imagery are formed during subsequent processing cycles.

22. The device of claim 21 wherein said means for applying an incremental amplitude and phase adjustment includes a recirculating path having a complex multiplier therein for applying an approximately linear amplitude and phase slope to the accumulated sum of the radar signals forming the associated subarray signal.

23. The device of claim 22 wherein said means for combining includes a different group complex multiplier coupled to each processor channel output for applying a group amplitude and phase adjustment to each subarray signal, and means for summing the output signals of said amplitude and phase group complex multipliers.

24. The device of claim 22 wherein each processing channel includes: an accumulator memory device for storing the subarray signals from the preceding processing cycle, a summation circuit, a complex multiplier coupled between said accumulator memory device and said summation circuit; said means for modifying includes means for applying the newest radar data associated with the particular subarray, and means for applying the oldest corresponding data comprising the corresponding subarray signal of the preceding cycle to the summation circuit, such that the newest radar data is added to and the oldest data is subtracted from the output signal of said complex multiplier.

25. The device of claim 22 wherein each processor channel further includes means for varying the multiplier value of the complex multiplier as a function of the processing period within each processing cycle.

26. The device of claim 21 wherein said forming means includes two substantially identical processor channels associated with each subarray signal, and a switch network coupled to each pair of said channels; and said means for modifying further comprises means for controlling said switch network so that one channel of said pair of processing channels associated with each subarray signal provides the corresponding subarray signal during one processing cycle and is cleared and reinitialized during the next cycle, and the other channel is cleared and reinitialized during said one processing cycle and provides said subarray signal during said next cycle.

27. The device of claim 21 wherein each processor channel further comprises means for varying the relationship between the time of the receipt of particular radar signals and the processing period within each recurring cycle in which said particular radar signals are used to modify said resultant amplitude and phase adjusted signal.

28. A mapping system for providing synthetic array line-by-line imagery data in the form of signals formed during each processing period of recurring cycles of said periods, said system comprising:
- a radar for transmitting and receiving energy at a preselected angle with respect to a line of motion of said radar;
- a main memory device coupled to said radar, having M x N x K data storage stages and N+1 equispaced output taps, where M is number of range elements being mapped, N is the number of subarrays forming each array, and K is the number of presummed radar sweeps forming each subarray;
- means, coupled to said main memory device, for forming a plurality of subarray signals during each processing period, said forming means including a plurality of processing channels one of which is associated with each subarray signal, and each processing channel includes means for coupling said channel between adjacent output taps on said memory, means for applying incremental amplitude and phase adjustments to the corresponding subarray signal of the preceding processing cycle, and means for modifying the resultant amplitude and phase adjusted signal to compensate for changes in the associated subarray occurring since the preceding processing cycle;
- means, coupled to said forming means, for combining said plurality of subarray signals formed during each processing period to provide focused imagery data signals; whereby imagery data corresponding to one of a plurality of range elements is formed during a corresponding processing period each cycle, and subsequent lines of imagery are formed during subsequent processing cycles; and
- means for displaying the imagery data signals as a synthetic array map.

29. The system of claim 28 wherein said means for applying an incremental amplitude and phase adjustment includes a recirculating path having a complex multiplier therein for applying an approximately linear amplitude and phase slope to the accumulated sum of the radar signals forming the associated subarray signal.

30. The system of claim 29 wherein each processing channel includes an accumulator memory device for storing the subarray signals from the preceding processing cycle, a summation circuit, a complex multiplier coupled between said cycle memory device and said summation circuit; and said means for modifying includes means for applying the newest radar data associated with the particular subarray and means for applying the oldest data comprising the corresponding subarray signal of the preceding cycle to the summation circuit, such that the newest radar data is added to and the oldest data is subtracted from the output signal of said complex multiplier.

31. The system of claim 29 wherein each processor channel further includes means for varying the multiplier value of the complex multiplier as a function of the processing period within each processing cycle.

32. The system of claim 28 wherein said forming means includes two substantially identical processor channels associated with each subarray signal and a switch network coupled to each pair of said channels; and said means for modifying further comprises means for controlling said switch network so that one channel, of said pair of processing channels associated with each subarray signal, provides the corresponding subarray signal during one processing cycle and is cleared and reinitialized during the next cycle, and the other channel is cleared and reinitialized during said one processing cycle and provides said subarray signal during said next cycle.

33. The system of claim 28 wherein each processor channel further comprises means for varying the relationship between the time of the receipt of particular radar signals and the processing period within each recurring cycle in which said particular radar signals are used to modify said resultant amplitude and phase adjusted signal.

* * * * *